United States Patent [19]
Takao

[11] Patent Number: 5,225,944
[45] Date of Patent: Jul. 6, 1993

[54] PORTABLE AUDIO APPARATUS
[75] Inventor: Hideo Takao, Suwa, Japan
[73] Assignee: Seiko Epson Corporation, Tokyo, Japan
[21] Appl. No.: 643,189
[22] Filed: Jan. 18, 1991

Related U.S. Application Data
[63] Continuation-in-part of Ser. No. 827,544, Jan. 29, 1992, which is a continuation of Ser. No. 455,655, Nov. 29, 1989, abandoned.
[51] Int. Cl.$^5$ ............................................. G11B 27/02
[52] U.S. Cl. ................................... 360/13; 360/63
[58] Field of Search .................. 360/13, 18, 61, 63

[56] References Cited
U.S. PATENT DOCUMENTS

| | | | |
|---|---|---|---|
| 3,939,489 | 2/1976 | Kawashima et al. | 360/13 |
| 4,095,261 | 6/1978 | Rodriquez | 360/13 |
| 4,280,148 | 7/1981 | Saxena | 360/13 |
| 4,357,636 | 11/1982 | Taketomi et al. | 360/13 |
| 4,786,983 | 11/1988 | Massari | 360/13 |

OTHER PUBLICATIONS
Radio Shack catalog, 1989, No. 432, Index p. 92.
Office Action dated Oct. 1991 from a corresponding Taiwan Patent Application.
Advertising brochure for a Sanyo product.
Advertising brochure for a Sampo product.

Primary Examiner—Vincent P. Canney
Attorney, Agent, or Firm—Blum Kaplan

[57] ABSTRACT

A portable audio apparatus allows a user to sing along with the recorded song, the user's voice and recorded song being outputted through a speaker. The apparatus permits the recorded lyrics or recorded tune of the song to be substantially eliminated prior to being reproduced by the speaker. The apparatus can operate in a fast forward or reverse mode and will stop between adjacent songs. A power savings circuit interrupts the supply of power to a motor to stop the latter from continuing to operate on a fast forward or reverse mode.

42 Claims, 23 Drawing Sheets

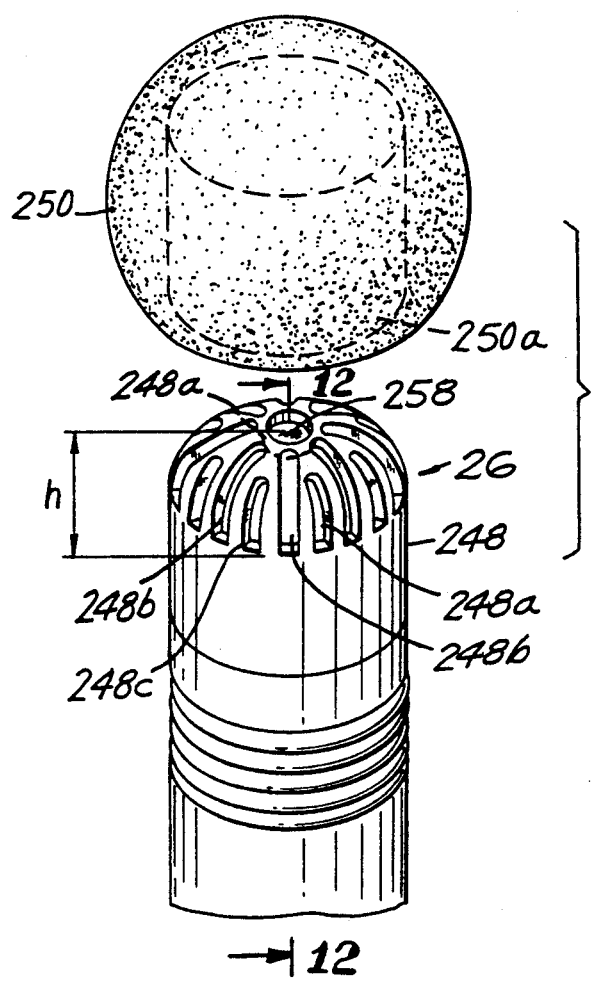
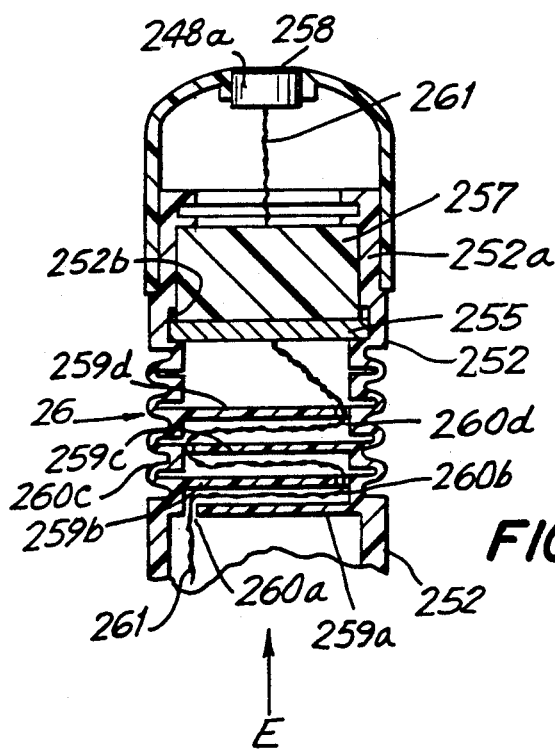

PORTABLE AUDIO APPARATUS

This application is a continuation-in-part application of U.S. application Ser. No. 07/827,544, filed Jan. 29, 1992, currently pending which is a continuation application of U.S. application Ser. No. 07/455,655, filed Nov. 29, 1989, now abandoned.

BACKGROUND OF THE INVENTION

The present invention relates generally to a portable audio apparatus, and in particular, to a portable audio apparatus for use with singing accompaniment which allows a user to sing along as a recorded song is played with the user's voice and song outputted in unison through a speaker of the apparatus. A control device of the apparatus permits the volume of the recorded vocal track to be varied including in a predetermined combination with the recorded musical tune. A power control device of the apparatus reduces energy consumption and enhances the portability of the apparatus.

A conventional singing accompaniment system (i.e. empty orchestral music or music accompaniment systems) includes a reproducing device for reproducing a song (e.g., lyrics and tune) stored on a recording medium such as magnetic tape, an optical disc or the like. A microphone inputs the vocal sounds of singing person. A mixing and amplifying device combines a signal representing the song provided by the reproducing device with a signal representing the vocal sound from the microphone and then amplifies the combined signal. A speaker converts the amplified combined signal into sound waves.

Typically the reproducing device and the mixing and amplifying device are integrally incorporated within a single housing unit. The microphone and speaker, however, are separate from the housing unit and are independent devices. Care must also be taken to sufficiently separate the microphone from the speaker to prevent howling by the latter caused by feedback therebetween.

Users of singing accompaniment systems prefer that the apparatus be portable. A conventional apparatus, however, requires a large installation space and is difficult to move. A conventional apparatus is bulky and weighs more than several kilograms. In fact, it is generally too large for an adult to move alone. A stationary audio is also rarely used apparatus. A stationary audio apparatus must also be near an electrical outlet further limiting its use as well as requiring the problems associated with electrical cords and the like.

Often song books are used while singing into the microphone of the apparatus. In this manner, when a person does not remember the lyrics of a song, he or she refers to one of the song books to continue singing. However, with a portable apparatus, a song book is not always readily available. A person who forgets the lyrics of a song and who cannot read from a song book will therefore stop singing.

Accordingly, it is desirable to construct a portable, audio reproducing apparatus which can select several tunes successively and provide a high quality reproduction of the same. The microphone should be a miniature, lightweight, wireless portable type which can easily adapt to the singing pose of a person. The apparatus would be miniaturized and lightweight, formed as a unitary structure with the microphone and speaker sufficiently separated from each other to prevent howling.

It is also desirable that the apparatus simultaneously control the vocal sound of the person singing and the reproduced recorded tune and be powered by a battery or the like to reduce power consumption. The apparatus should also assist the person singing who may not remember the lyrics to a song without resort to a songbook.

SUMMARY OF THE INVENTION

Generally speaking, in accordance with the invention, a portable audio apparatus permits a user to sing along as a recorded song is played with the user's voice and song outputted in unison through a speaker. A sound reproducing device produces a recorded vocal signal based on the recorded lyrics and a recorded musical tune signal based on the recorded tune. A synthesizing device combines the recorded vocal signal with the recorded musical tune signal and produces an output signal in response thereto representing the combination of the two signals. An adjusting device is operable for varying the combination of the recorded vocal signal and the recorded musical tune signal represented by the output signal. A control device can set the adjusting device to a predetermined combination of the recorded vocal signal with the recorded musical tune signals. This predetermined combination can be outputted through the speaker so that a user who has forgotten the lyrics to the song ca be assisted by listening to the recorded lyrics.

A microphone produces a vocal signal representing the user's voice. The synthesizing device adds this vocal signal to the output signal. The adjusting device includes an attenuating element for changing the magnitude of the recorded vocal signal and musical tune signal prior to combining the two signals to form the outputted signal.

In accordance with another aspect of the invention, a power saving device is included in the portable audio apparatus. A motor is provided for moving the recording medium in at least forward, fast forward and rearward modes. A sound reproducing device is provided for reproducing the recorded vocal sound signals and the recorded musical tune signals stored o the recording medium. A detecting device determines when the combined recorded vocal signal and musical tune signal are below a predetermined level and produces an output signal based thereon. An additional control device controls the supply of power to the motor in response to the output signal of the detecting device.

The power saving device further includes a start switching device for initiating operation of the detecting device based on the motor moving the recording medium in either the fast forward or rearward modes. A generating device responsive to the output signal produces an information signal. The speaker provides a message based on the information signal.

The start switching device of the apparatus has a fast forward switch operable for being maintained in locked and unlocked positions and for initiating the motor to move the recording medium in the fast forward mode when in its locked position. The start switching device also includes a rearward switch operable for being maintained in the locked and unlocked positions and for initiating the motor to move the recording medium in the rearward mode when in its locked position. An AND circuit with a first leaf switch and a second leaf switch respectively control the operation of the detecting device based on the recording medium moving in the fast forward and rearward modes.

Accordingly, it is an object of the invention to provide an improved portable audio apparatus which is miniature and lightweight.

It is another object of the invention to provide an improved portable audio apparatus which has a power consumption requirements.

It is a further object of the invention to provide an improved portable audio apparatus having a singing accompaniment function which assists a person singing who forgets the lyrics to the song.

It is still another object of the invention to provide a improved portable audio apparatus which prevents howling.

It is still a further object of the invention to provide an improved portable audio apparatus which can easily and simply vary the volume of the recorded lyrics which are reproduced by the speaker of the apparatus.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 11 is an exploded perspective view of the microphone of FIG. 9(a);

FIG. 12 is a cross-sectional view of the microphone taken along lines 12—12 of FIG. 11;

DETAILED DESCRIPTION OF THE PREFERRED EMBODIMENTS

Figure 1A:
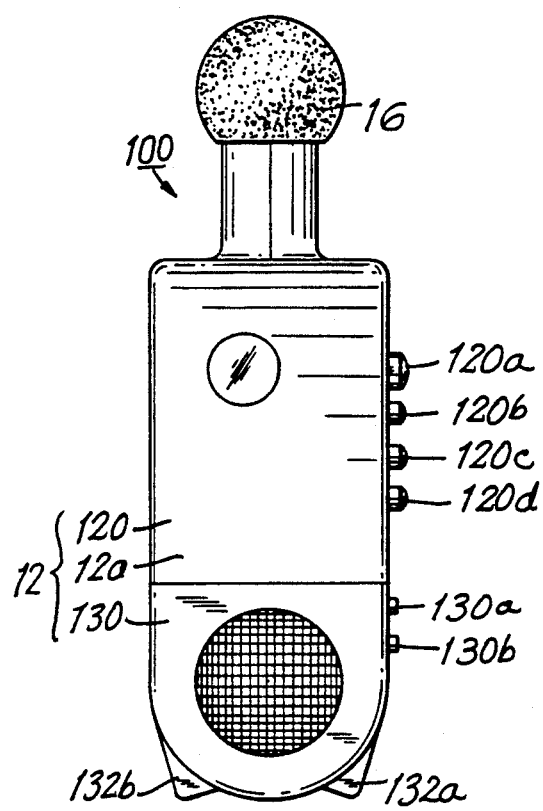
FIG. 1(a) is a front elevational view of a portable audio apparatus constructed in accordance with a first embodiment of the invention.
Figure 1B:
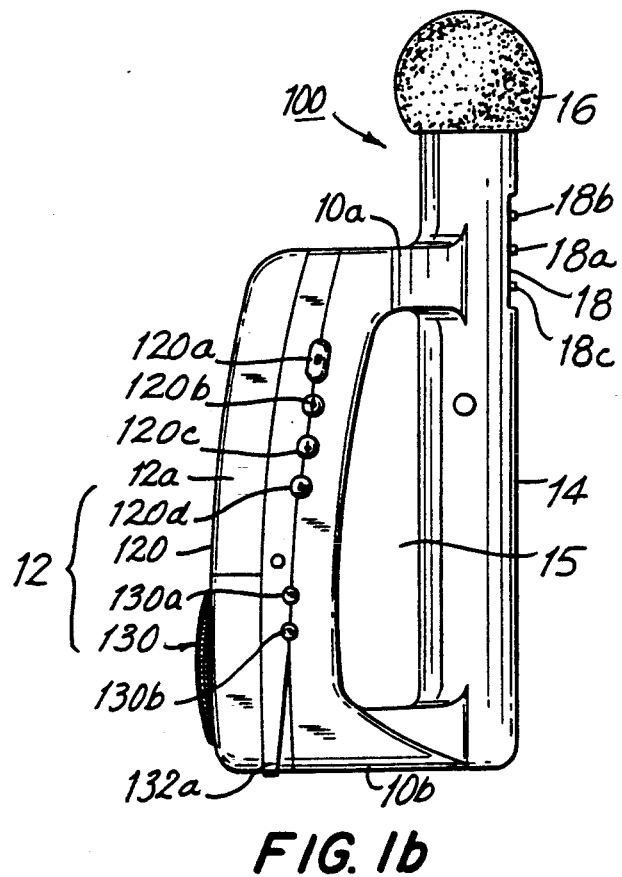
FIG. 1(b) is a right elevational view of FIG. 1(a)

Reference is first made to FIGS. 1(a), 1(b), 1(c) and 1(d) of the drawings which depict a portable audio apparatus, generally indicated at 100 and constructed in accordance with a first preferred embodiment of the invention. Portable audio apparatus 100 has a compact size. The maximum external dimensions are as follows: overall height of 283 mm including projections, a width of 97 mm and a depth of 28 mm. The maximum weight is 640 g including a dry battery.

Apparatus 100 is provided with an apparatus body section 12, a gripping portion 14 and a microphone section 16. Further, apparatus body section 12 includes a vocal sound medium storage section 120, a substantially rectangular parallelopiped body casing 12a for storage of an audio cassette and a speaker storage section 130. Speaker storage section 130 is positioned below vocal sound medium storage section 120. A tape deck, compact disc or the like for reproducing vocal sounds is stored on the rear side of vocal sound medium storage section 120 as discussed below. Although other storage devices such as a compact disc can be used, for exemplary purposes, the recording medium discussed hereinafter will be a magnetic type.

Push button tops 120a, 120b, 120c and 120d of push button switches and volume knobs 130a and 130b are provided on the casing side surface of vocal sound storage section 120 and project therethrough. Push button tops 120a, 120b, 120c and 120d and knobs 130a and 130b are constructed with different colors to easily distinguish one from the other. Push button top 120a stops the feeding of a magnetic tape. Push button top 120b initiates fast-feeding of the magnetic tape. Push button top 120c initiates rewinding the magnetic tape and push button top 120d activates the reproduction of a vocal sound signal which has been recorded on the magnetic tape. Echoes produced by the microphone can be eliminated through adjustment of volume knob 130a. Volume balance between the user's voice picked up by the microphone and the song recorded on the tape and reproduced by apparatus 100 is adjusted by volume knob 130b.

Grip section 14 and microphone section 16 are integrally connected to each other to form a substantially cylindrical body. Leg parts 132a and 132b project from the left and right sides of the bottom surface of apparatus body 12. A control panel 18 is provided on the side surface of the cylindrical casing between grip section 14 and microphone section 16. Control panel 18 is provided with a side switch knob 18a and volume dials 18b and 18c positioned respectively above and below knob 18a. Knob 18a changes the operation mode of apparatus 100 from singing accompaniment (i.e. empty orchestral music or music accompaniment) to a loudspeaker for microphone 16. When operating a sound multiplex tape, volume dial 18b adjusts the volume balance between the recorded lyrics and the recorded musical tune. Volume dial 18c adjusts the sound volume of microphone sound volume. Cylindrical grip section 14 is integrally coupled to apparatus body section 12 through upper coupling part 10a and lower coupling part 10b. An opening 15 is formed between grip section 14 and apparatus body section 12 for the user to insert his or her hand therethrough in holding apparatus 100.

Figure 2:
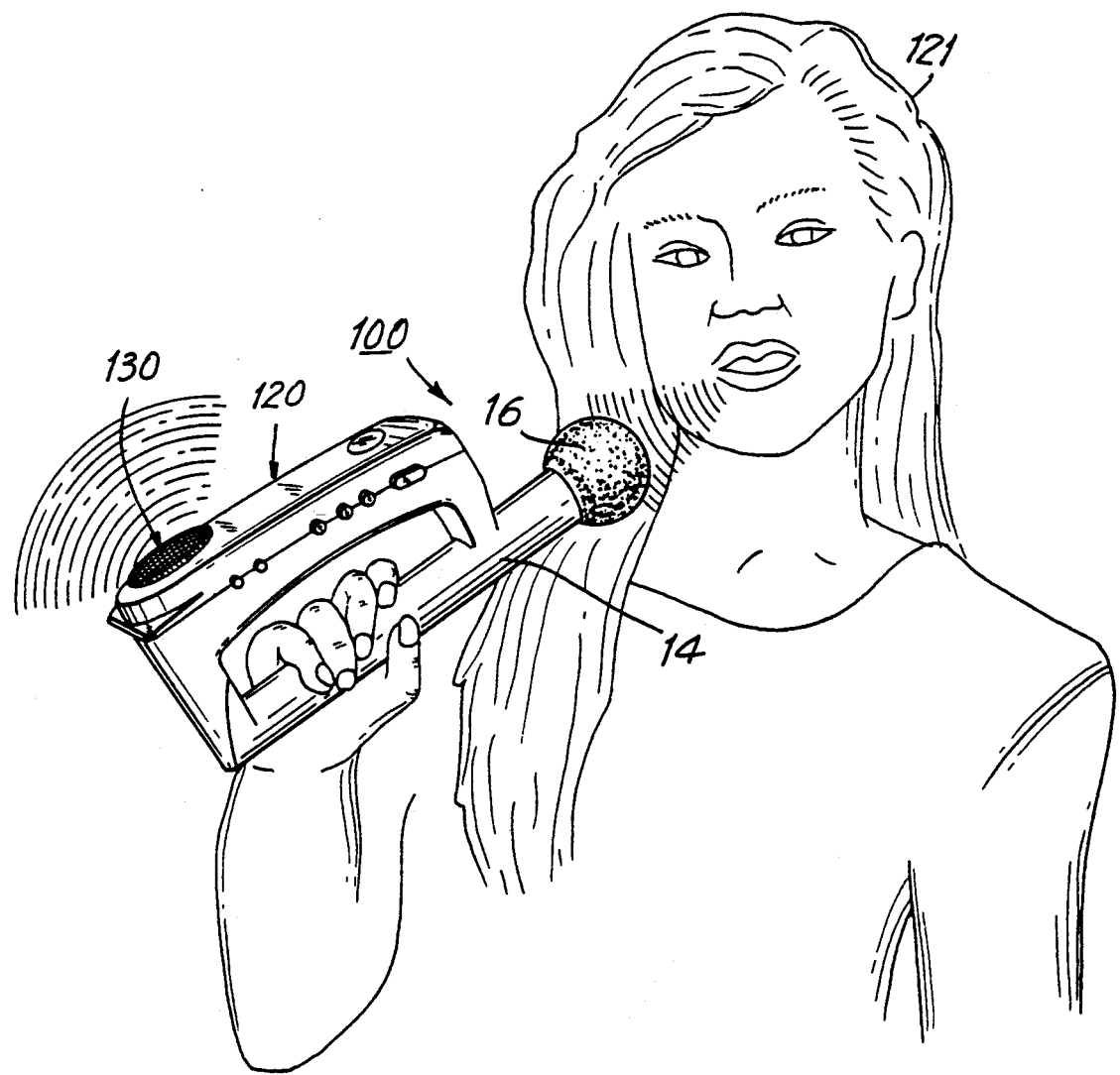
FIG. 2 is a perspective view of FIG. 1(a) illustrating operation by a user.

Referring now to FIG. 2, a user 121 is shown operating the miniature and lightweight apparatus 100 in a preferred manner. Grip section 14 is held by one or both hands to carry apparatus 100. At the same time, user 121 sings a song through microphone section 16 to produce the singing accompaniment. Since apparatus 100 is miniature and lightweight, apparatus 100 can be easily carried by user 121 and placed as desired by user 121 in singing a song, similar to an ordinary wireless microphone.

Figure 3:
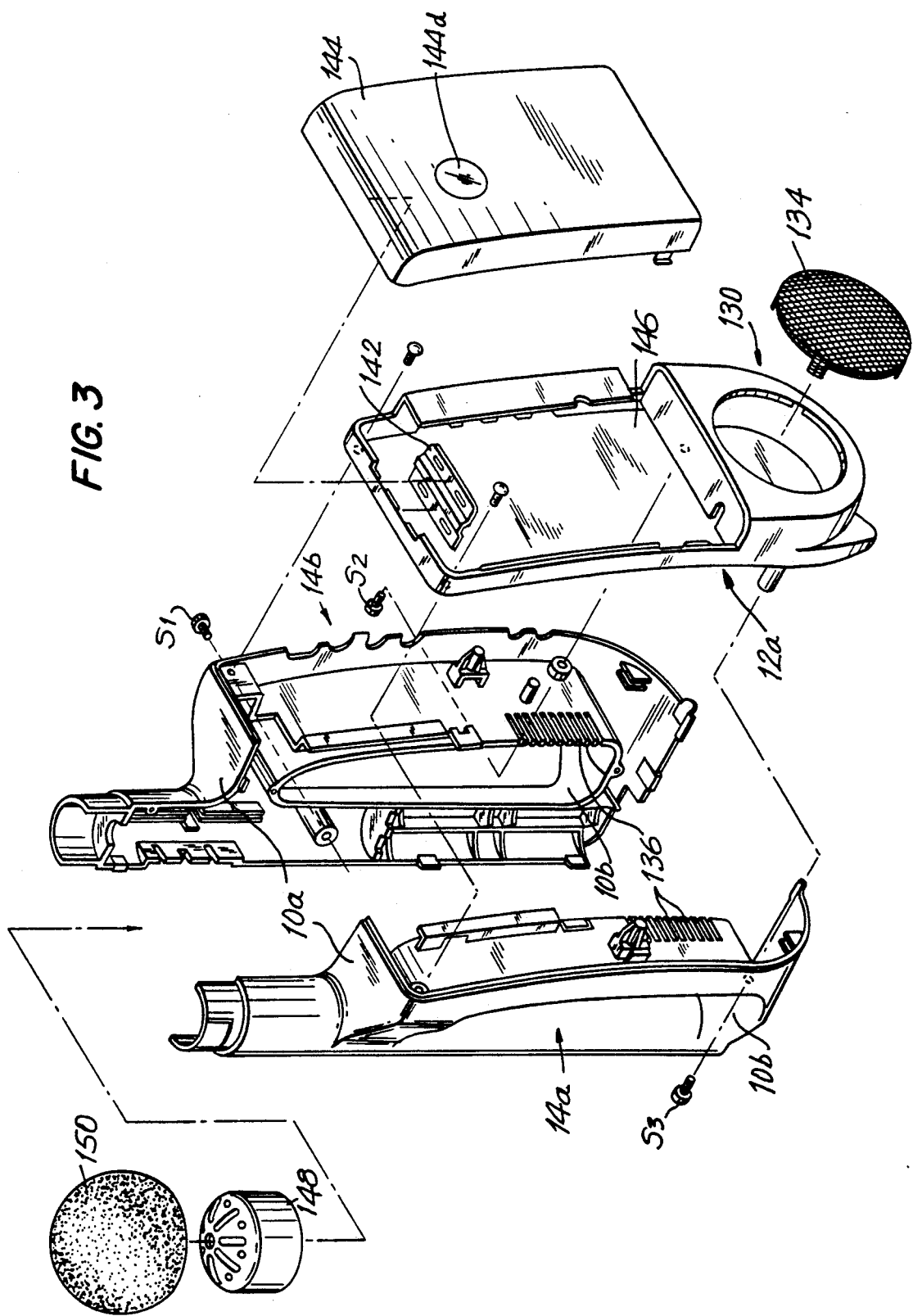
FIG. 3 is an exploded perspective view of FIG. 1(a)

As shown in FIG. 3, apparatus 100 is provided with a resin body casing 12a, a resin right half 14a and a resin left half 14b. To assemble apparatus 100, right half 14a and left half 14b are connected together by a screw $S_1$. Body casing 12a is coupled to the unit formed by right half 14a and left half 14b by screws $S_2$ and $S_3$. An opening and closing cover 144 is coupled to body casing 12a by a resin hinge 142. In this manner, cover 144 can be opened and closed freely along the vertical direction through the intermediary portion of resin hinge 142. When cover 144 is closed, an air-tight tape cassette storage chamber 146 is formed. A speaker 132 is disposed in speaker storage section 130 in body casing 12a. The front surface of speaker 132 (see FIG. 4) is covered with a mesh-like speaker cover 134. A cap 148 (i.e. microphone holder) constructed with a capacitor-type microphone is inserted in the upper end part of the cylindrical body. The top of right half 14a, the top of left half 14b and cap 148 are then covered with a sponge windshield 150.

As best shown in FIG. 1(a), push button tops 120a, 120b, 120c and 120d are provided as push button switches. Push button tops 120a, 120b, 120c and 120d and knobs 130a and 130b project from the side surface of body casing 12a. Alternatively, a miniature planar control panel formed from touch switches and similar elements may be used in place of the push buttons and knobs although inferior in visibility and manipulatability. If the apparatus is used in the dark, a miniature planar control panel is barely visible. On the other hand, the dark and bright contrast of push button tops 120a, 120b, 120c and 120d and knobs 130a and 130b projecting from the side surface of casing 12a are more easily recognizable and therefore more suitable. The different colors of push button tops 120a, 120b, 120c, 120d and knobs 130a, 130b are also highly distinguishable.

Figure 4:
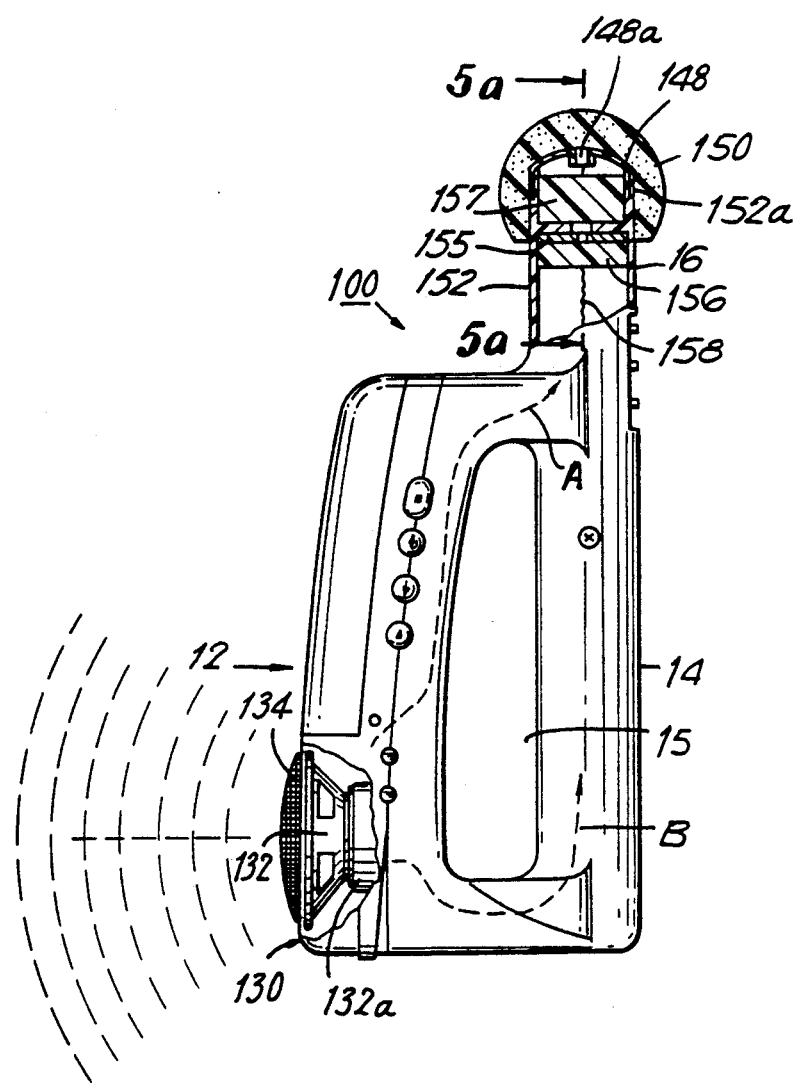
FIG. 4 is a partial sectional side elevational view of the speaker and the microphone portion of FIG. 1(a)

Referring now to FIG. 4, the positional relationship between speaker 132 and microphone section 16 is shown. Miniature speaker 132 is provided with a relatively powerful magnet 132a to ensure sufficient speaker sound volume for singing accompaniment. Speaker 132 and magnet 132a are stored in speaker storage section 130 positioned in the lower section of apparatus body 12. The portability of apparatus 100 requires miniaturization of speaker 132. Magnet 132a serves as a power saving device to further enhance portability. Although magnet 132a is relatively heavy and increases the total weight of apparatus 100, the overall weight of apparatus 100 can be minimized (i.e., be made lightweight) by reducing the weight and the number of other components. Therefore, the added weight of magnet 132a does not adversely affect the portability of apparatus 100. Since speaker storage body section 130 is positioned in the lower part of apparatus body section 12 and magnet 132a has a relatively heavy weight, apparatus 100 lowers its gravitational center and therefore, improves the stationary and standing stability of apparatus 100.

Cylindrical microphone section 16 and capacitor microphone 148a fit together at their top portions with cap 148. The direction of the pressure receiving area of microphone 148a is set along the axis of microphone section 16. Accordingly, the center axis of directivity of capacitor microphone 148a and the center axis of directivity of speaker 132 are orthogonal to each other. The position of capacitor microphone 148a is in the uppermost part of apparatus 100, while the position of speaker 132 is in the lowermost part of the apparatus having a distance therebetween of approximately 24 cm.

Accordingly, the positional relationship as set forth above prevents a howling condition to be produced when microphone 148a and speaker 132 are placed too close to one another. The greater the distance between speaker 132 and capacitor microphone 148a, the less howling. However, a large distance between capacitor microphone 148a and speaker 132 decreases the portability and adaptability of apparatus 100. Therefore, the optimum distance between microphone 148a and speaker 132 is limited. The placement of capacitor microphone 148a is at an angle of 180° to the placement of speaker 132.

In an alternative embodiment, microphone section 16 inclines rearwardly in the direction of grip section 14. The position of capacitor microphone 148a also may be changed. The positional relationship of the components required to construct apparatus 100 for singing accompaniment normally requires the speaker section to be set before grip section 14 and microphone section 16.

Microphone section 16 is above grip section 14, while speaker 132 and microphone section 16 are separated by a distance which minimizes and generally eliminates howling. Microphone section 16 may be positioned either before (in front of) or behind gripping section 14, but should not being arranged before the speaker section. The casing body, serving as a speaker box in which the speaker section is disposed, may also store the vocal sound reproducing device. The vocal sound reproducing device also can be disposed in a casing integrally incorporated within the casing body. The speaker section also may be positioned before the storage section for the vocal sound reproducing device although external appearances of apparatus 100 may be sacrificed.

Grip section 14 is integrally incorporated within the storage section for the vocal sound reproducing device, and microphone section 16 is integrally incorporated with either grip section 14 or the upper or lower section of the vocal sound reproducing device. Advantageously, apparatus 100 be held by one hand since microphone section 16 is usually rod-like. As shown in FIG. 4, grip section 14 and microphone section 16 are connected together in a rod-like shape. The positional relationship of microphone section 16 and speaker 132 substantially eliminates howling, since feedback to the speaker 132 from microphone section 16 is substantially avoided.

Howling can nevertheless occur, since feedback from speaker storage section 130 to microphone section 16 can occur within the housing of apparatus 100. Although slight, communication occurs within the casing through coupling parts 10a, 10b. Accordingly, an increased sound from speaker 132 can be fed back as an internal sound to capacitor microphone 148a.

The inside of coupling part 10a is hollow. The hollow region is effectively used for wiring the microphone, speaker and power source. Coupling part 10b is also hollow to permit wiring from the power source therethrough. An empty space located within grip section 14 is used as a battery storage compartment (not shown). The path of feedback from speaker 132 to microphone 148a through coupling parts 10a and 10b generally occurs along a pair of broken lines A and B shown in FIG. 4. Not only does the speaker sound propagate through the space within the casing, but the secondary vibration of the casing also may reach microphone section 16 to create howling.

Figures 5A, 5B:
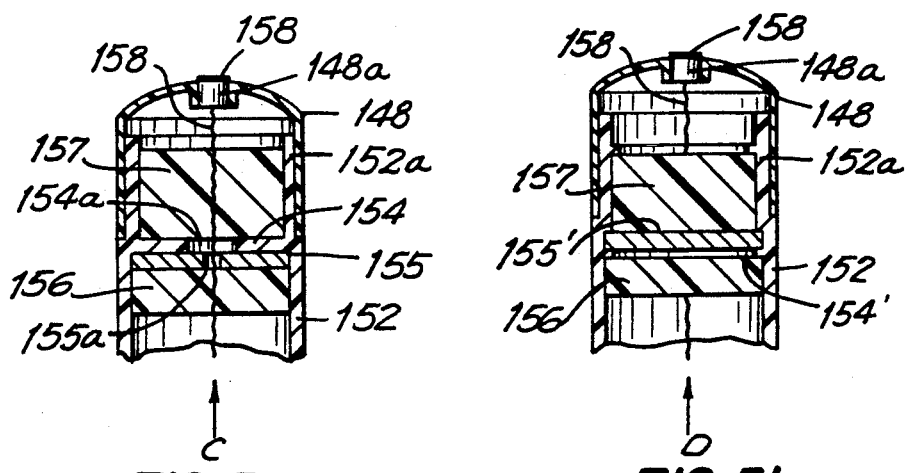
FIG. 5(a) is a cross-sectional view of the microphone taken along lines 5—5 of FIG. 4.
FIG. 5(b) is a cross-sectional view of another microphone taken along lines 5—5 of FIG. 4.

To prevent such howling, a speaker sound feed-back preventing structure is employed in apparatus 100 as shown in FIGS. 4 and 5. Referring to FIGS. 4 and 5(a), cap 148 fits on a slightly reduced diameter end part 152a of a cylindrical casing 152, and capacitor microphone 148a is attached to the top part of cap 148. A perforated partition plate 154 is integrally formed in cylindrical end part 152a. Under partition wall 154, a sound shield plate 155 in the form of a perforated metal disc and a lower sound absorbing member 156 made of relatively high density foamed resin are disposed. Sound shield plate 155 is formed from iron and lower sound absorbing member 156 and upper sound absorbing member 157 are formed from foamed urethane. Sound absorbing member 156 has excellent elasticity while exhibiting the position function for the sound shield plate 155. Further, an upper sound absorbing member 157 made of relatively high density foamed resin is disposed above partition plate 154. Wiring 158 is led out from capacitor microphone 148a through an aperture 154a in partition plate 154 and an aperture 155a in sound shield plate 155. A felt 158 is bonded to the pressure receiving surface of capacitor microphone 148a.

Therefore, feed-back sound propagated in the direction of arrow C in FIG. 5(a) is initially absorbed by lower sound shield member 156. Next, vibration energy which propagates through the casing is converted into thermal energy absorbed by sound shield plate 155 having a high specific gravity. Finally, feed-back sound waves leaking through apertures 155a, 154a are absorbed by upper sound absorbing member 57. Accordingly, the howling caused by feed-back sound and vibration in the casing is substantially eliminated.

Reference is now made to FIG. 5(b) which discloses another speaker sound feed-back preventing structure. In this structure, a relatively large specific weight iron disc is also used as a sound shield plate 155'. However, sound shield plate 155' is not provided with an aperture similar to aperture 154 shown in FIG. 5(a). Wiring 158 is led through a gap between the peripheral surface of sound shield plate 155' and the inner periphery of cylindrical end part 152. Therefore, sound shield plate 155 with aperture 155a of FIG. 5(a) must be carefully constructed so as to prevent the wire from making contact with the edge of aperture 154a. If wire 158 makes contact with aperture 154a, a slight vibration of wiring 158 would be created causing a feed-back sound wave to be transmitted to the upper part of sound shield plate 155. In the structure of FIG. 5(b), sound shield plate 155' is set on a node-like step 154' to decrease the chances of vibration.

Figure 6:
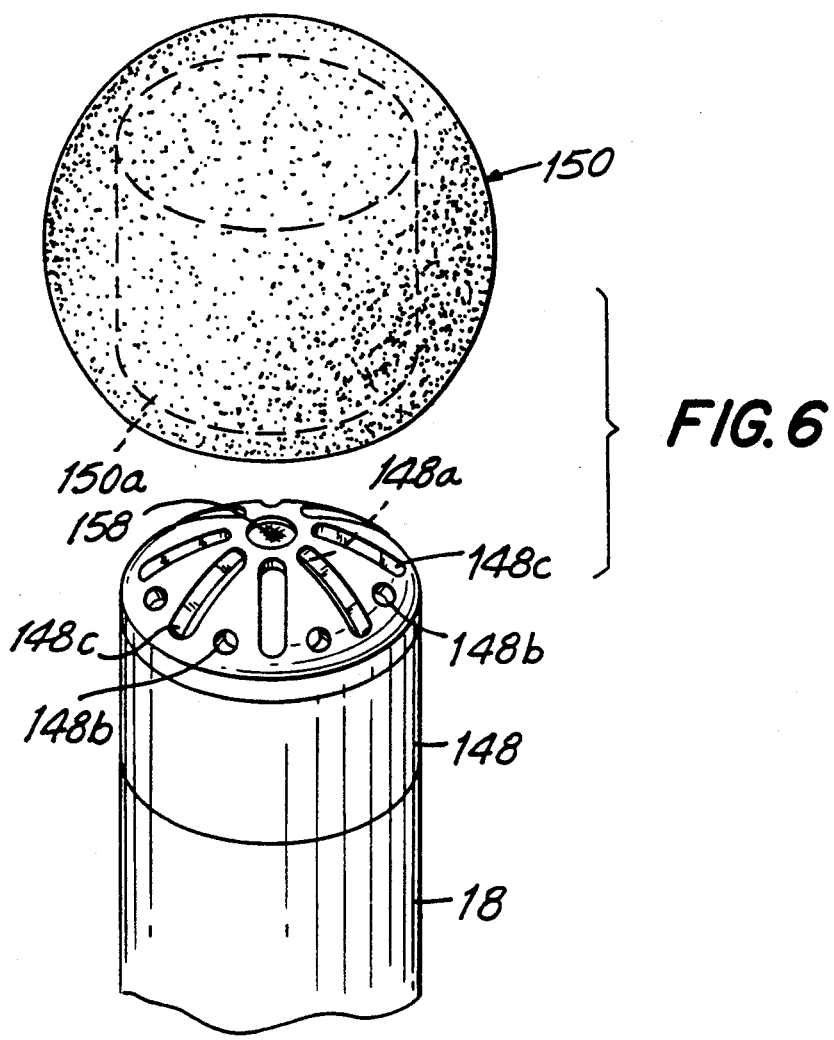
FIG. 6 is an exploded perspective view of the microphone of FIG. 1(a)

FIG. 6 discloses the relationship between sponge windshield 150 and cap 148. Sponge windshield sponge 150 is made of relatively low density foamed resin. In a preferred embodiment, a foam urethane is used to form sponge windshield 150. Further, windshield sponge 150 is formed with a cap fitting recess 150a. Windshield sponge 150 is adapted to relieve the application of excessive sound pressure upon the pressure receiving surface of capacitor microphone 148a. Felt 158 bonded to the pressure receiving surface of capacitor microphone 148 in the circular hole in the top part of cap 148 further relieves the application of excessive sound pressure.

The upper part of cap 148 has a substantially dome-like shape and is formed with elongated holes 148c and circular holes 148b extending radially from centrally positioned capacitor microphone 148a. Elongated holes 148c and circular holes 148b are interposed between one another. In this manner, abnormally high sound waves of a person singing are not reflected by the upper surface of cap 148 and thereby prevent vibration to the pressure receiving surface of capacitor microphone 148a. Feed-back sound propagating from within the casing to capacitor microphone 148a is therefore dispersed to prevent howling.

Figure 8:
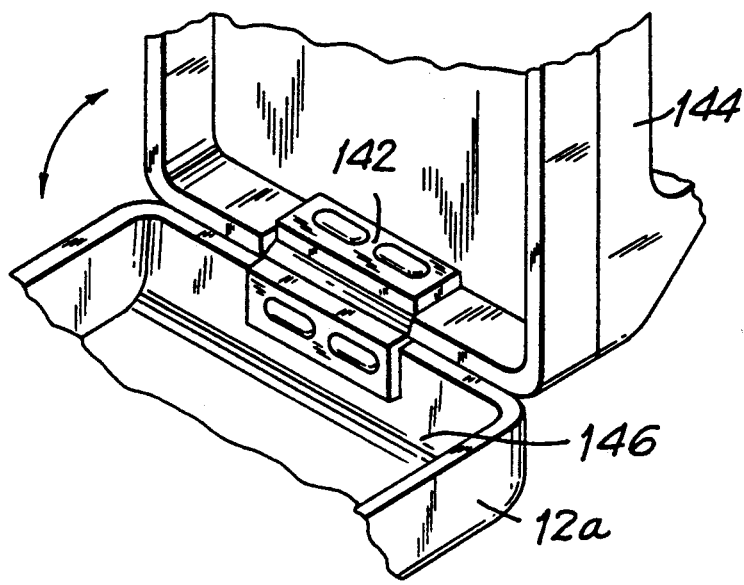
FIG. 8 is a partial perspective view of a hinge for the cover of FIG. 7.
Figure 7:
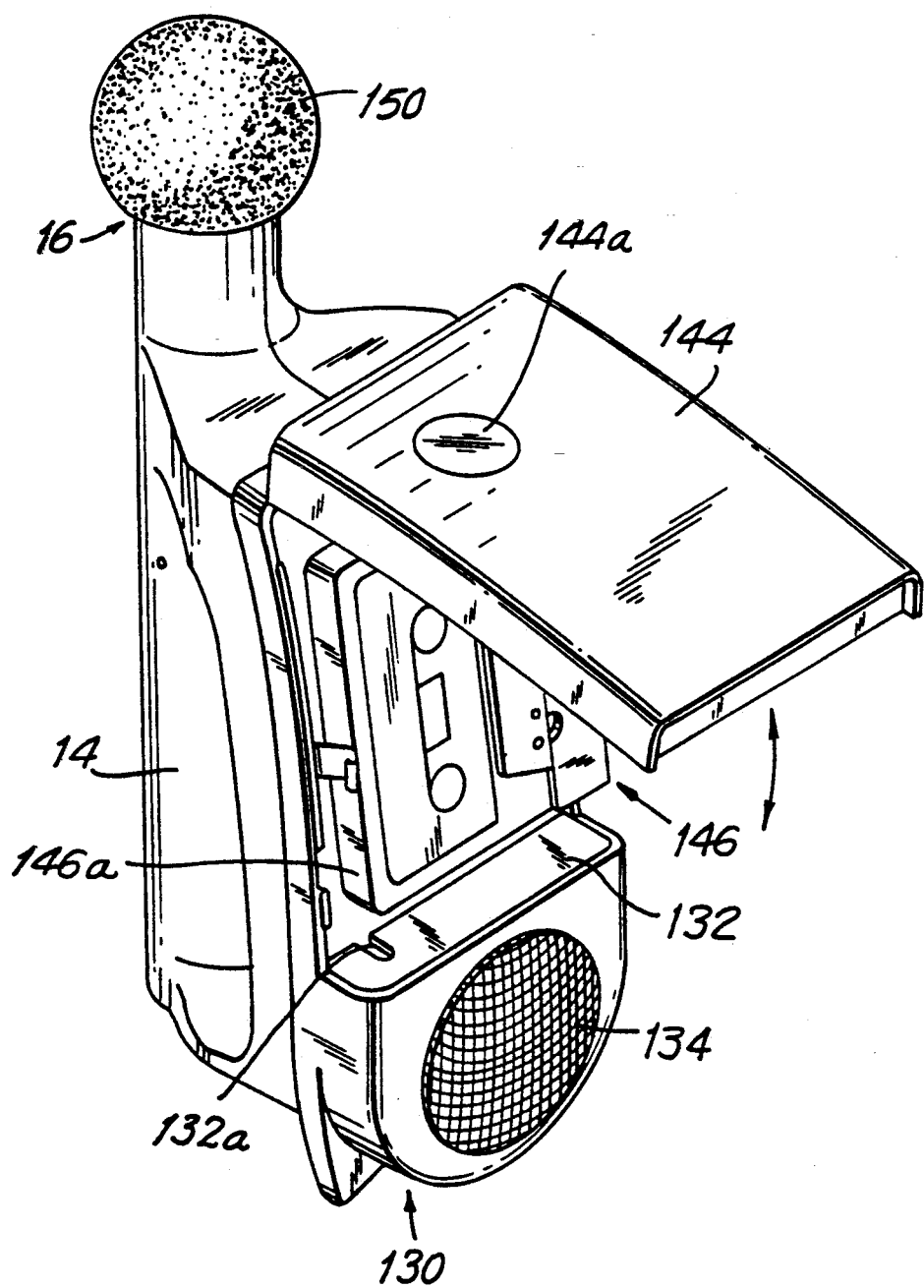
FIG. 7 is a perspective view of a cover of FIG. 1(a) in an open position.

Apparatus 100 includes opening and closing cover 144 having a transparent window 144a through which the remaining quantity of tape is visible, as shown in FIGS. 7 and 8. Cover 144 is coupled to body casing 12a defining tape cassette storage chamber 146 by means of a resin hinge 142. Resin hinge 142 is used to reduce the number of components of apparatus 100 to make the apparatus lightweight. After a tape cassette 146a is loaded in tape cassette storage chamber 146, cover 144, with cover 144 closed, tape cassette storage chamber 146 is substantially in an air-tight condition.

Speaker storage section 130, serving as a speaker box, has a relatively small acoustic space when speaker 132 is disposed therein. By increasing the acoustic space speaker storage section 130 can be enlarged. Any increase in the size of speaker storage section 130 is limited by design constraints for the overall product as set forth above. The sound quality also can deteriorate if the acoustic space is too small. Therefore, in apparatus 100, the remaining space in tape cassette storage section 146 is used a an auxiliary sound acoustic space. At the same time, construction constraints also require limiting the space of speaker storage section 130. A communication hole 132a is formed in a part of partition wall 132 separating speaker storage section 130 from cassette storage chamber 146. Communication hole 132a allows tape cassette storage chamber 146 in which tape cassette 146a is loaded to serve as a part of the internal acoustic space of apparatus 100. Apparatus 100 therefore reproduces a song accompanied by a person singing having a relatively high sound quality despite being compact.

Figure 1C:
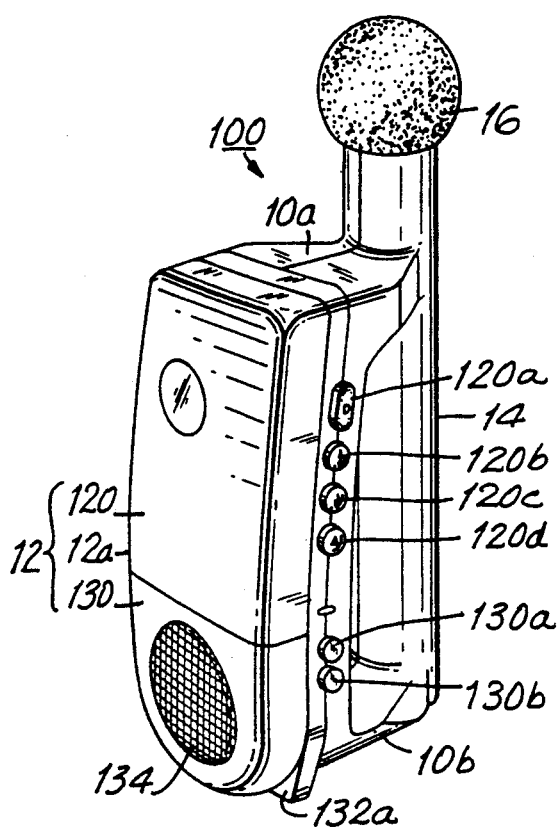
FIG. 1(c) is a perspective view of FIG. 1(a)
Figure 1D:
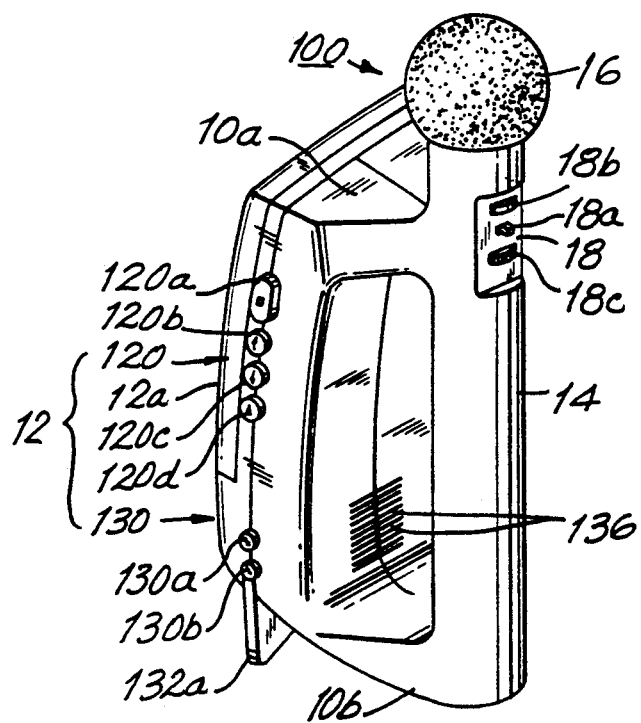
FIG. 1(d) is another perspective view of FIG. 1(a)

As shown in FIGS. 1(d) and 3, a plurality of slit holes 136 are formed on the rear side of body casing 12a. The entire surface of the speaker storage section 130 is covered with mesh-like cover 134 as shown in FIG. 1(c) while the rear surface of the speaker storage section is formed with a plurality of slit holes 136. The plurality of slit holes 136 are provided to allow the person singing who holds grip section 14 by one hand to hear his/her own voice as amplified by speaker 132. The dimensions and the number of slit holes 136 should be carefully considered to prevent the occurrence of howling. If the sound outputted through the side of grip section 14 is increased, the slits may cause feed-back to capacitor microphone 148a. In addition, slit holes 136 dissipate heat generated from internal electronic components. A fabric (not shown) is lined on the inside of narrow slit holes 136 to prevent dust or the like from entering apparatus 100.

Reference is now made to FIGS. 9(a), 9(b), 9(c), 9(d), 9(e) and 9(f) of the drawings which depict a portable audio apparatus, generally indicated at 200 and constructed in accordance with an alternative embodiment of the invention. Portable audio apparatus 200 also has a compact size. Similar to apparatus 100, the maximum external dimensions of apparatus 200 are as follows: a height of 300 mm, a width of 100 mm and a depth of 121 mm. The total weight of apparatus 200 is 700 g, including dry batteries. Apparatus 200 includes an apparatus body 22, a grip section 24 and a microphone section 26. Apparatus body section 22 includes a vocal sound medium storage section 220, a substantially rectangular parallelopiped body casing 221 for storage of an audiocassette or other suitable recording medium and a speaker storage section 230.

Push button tops 220a, 220b, 220c, 220d and 220e of push button switches and volume rotary discs 230a and 230b are provided on the casing side surface of vocal sound storage section 220 and project therethrough. Push button tops 220a, 220b, 220c, 220d and 220e and rotary discs 230a and 230b are constructed with different colors to enable the user to easily distinguish one from the other. Push button top 220a stops the feeding of a magnetic tape. Push button top 220b initiates feeding of the magnetic tape. Push button top 220c initiates rewinding of the magnetic tape. Push button 220d initiates playing of the reproduced vocal sound signal which is recorded on the magnetic tape. Push button top 220e initiates the play mode (i.e. reproducing mode) after completion of an intro-scan of a selected tune (i.e., scanning to determine the beginning or end of a song) and therefore acts as a start/stop push button. Further, volume rotary disc 230a adjusts for echoes created by use of the microphone. Volume rotary disc 230b adjusts the volume balance between the microphone and tape.

Each volume rotary disc 230a and 230b has an exposed surface with an area greater than that of a finger of an adult person. Volume rotary discs 230a and 230b are formed with a semispherical projection m and semispherical recess n. Knobs 130a and 130b of apparatus 100 are rotated and manipulated while holding the knobs between the thumb and the forefinger. On the other hand, rotary discs 230a and 230b of apparatus 200 can be easily rotated by any one of the five fingers of a user. Therefore, rotary discs 230a and 230b improve the manipulatability of the controls.

A volume rotary disc 230c is provided on the other casing side surface and is also formed with a semispherical projection m and semispherical recess n. In addition, rotary disc 230c adjusts the volume balance between the recorded lyrics and musical tune of a recorded song when using a sound multiplex tape. Push button top 230d, positioned below rotary disc 230c, decreases the volume of the recorded lyrics, while initiates muting of the recorded lyrics and simultaneously increases the volume of the recorded music tune. This button is applicable for non-multiplex tapes. An input jack 230e is provided for an AC adapter during use of an external power source.

Grip section 24 and microphone section 26 are integrally connected with each other to form a substantially cylindrical body. Further, resilient leg parts 232a and 232b are projected from the left and right sides of the lower part of speaker storage section 230 and a resilient leg part 232c is projected from the bottom part of grip section 24. A control panel 28 is provided on the side surface of the cylindrical casing between grip section 24 and microphone section 26. Control panel 28 is provided with a push button top 28b for a vocal sound assist switch for issuing a vocal sound only when it is continuously pushed for a long period of time. Cylindrical grip section 24 is integrally coupled to apparatus body section 22 by means of upper and lower coupling parts 20a and 20b. A through space 15 is formed between grip section 24 and apparatus body section 22 creates a grip for the user to insert his or her hand.

Figure 9A:
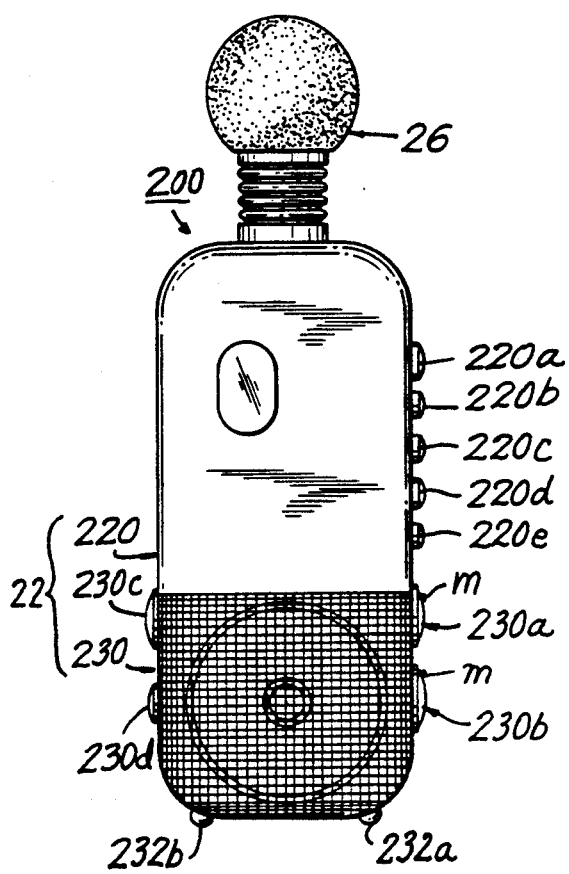
FIG. 9(a) is a front elevational view of a portable audio apparatus constructed in accordance with another embodiment of the invention.
Figure 9B:
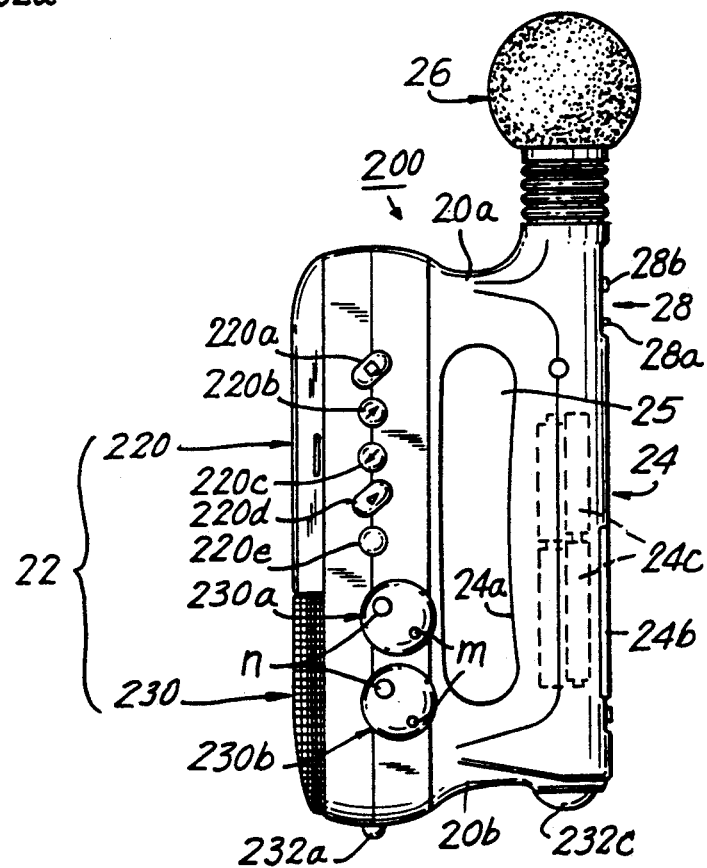
FIG. 9(b) is a right side elevational view of FIG. 9(a)

Apparatus 200, as in apparatus 100, is provided with a resin body casing 22a, a resin right half 24a and a resin left half 24b. To assembly apparatus 200, right half 24a and left half 24b are connected together by a screw $S_1$. Body casing 22a is coupled to the unit formed by right half 24a and left half 24b by screws $S_2$, $S_3$, $S_4$ and $S_5$. An opening and closing cover 244 is laterally operable. When cover 244 is closed, a tape cassette storage chamber 246 forms a complete air-tight condition. A speaker (not shown), similar to that set forth in apparatus 100, is disposed in speaker storage section 230 in body casing 22a. The front surface of the speaker is covered with a mesh-like speaker cover 234. At the same time, cap 248 is constructed with a capacitor microphone inserted in the upper end of the cylindrical body. The top of right half 24a, the top of left half 24b and cap 248 are coupled together and are then covered with a sponge windshield 250. As shown in FIG. 9(b), grip section 24 is not formed with a cylindrical shape having a uniform diameter, but has a bulged part 24a which fits in the palm of a hand of a user. In this manner, apparatus 200 can be easily held. A battery cover 24b is attached to the outer surface of grip section 24 and batteries 24c are disposed inside grip section 24.

Referring now to FIG. 11, the relationship between windshield sponge 250 and cap 248 is disclosed. Windshield sponge 250, similar to windshield sponge 150 of apparatus 100, is made of relatively low density foamed resin and is formed with a cap fitting recess 250a. In the preferred embodiment, windshield sponge 250 is formed from foamed urethane. Capacitor microphone 248a is fitted in a circular hole in the top part of cap 248. A felt 258 is bonded to the pressure receiving surface of capacitor microphone 248a. The upper part of cap 248 having a substantially dome-like shape, is formed with two kinds of elongated holes 248b and 248c, extending radially from the capacitor microphone 248a as a center. Elongated holes 248b and 248c are interposed between one another.

The formation of elongated holes 248b and 248c is similar to elongated holes 148c and circular holes 148b of apparatus 100. This configuration prevents excessive sound volume from a singing person to reflect upon the upper surface of cap 248 and hinder the vibration of the pressure receiving surface of the microphone. Accordingly, the feed-back sound propagating to capacitor microphone 248a from the inside of the casing is dispersed to prevent the occurrence of howling. In apparatus 200, elongated holes 248c are formed in place of the circular holes 148b of apparatus 100 to increase the number of openings within the dome-like upper part of cap 248. A height h of the dome-like part is set to a value which is greater than that of cap 148 in apparatus 100, thereby decreasing howling.

Referring to FIG. 12, cap 248 is fitted on a slightly reduced diameter end part 252a of cylindrical casing 252 of microphone section 26. An inner peripheral groove 252b is formed in the cylindrical end part 252a and is fitted with a sound shield plate 255 such as, but not limited to, a metal disc. An upper sound absorbing member 257 made of relatively high density foamed resin is disposed on the upper side of sound shield plate 255. Preferably, sound shield plate 255 is formed from iron and upper sound absorbing member 257 is formed from foamed urethane. Sound absorbing member 257 has excellent elasticity properties. Four node like partition walls 259a, 259b, 259c and 259d are integrally incorporated with the cylindrical casing 252 below the inner peripheral groove 252b. Node-like partition walls 259a, 259b, 259c and 259d are positioned in parallel with sound shield plate 255 and define wire passage openings 260a, 260b, 260c and 260, respectively. Openings 260a and 260b and openings 260c and 260d are diametrically opposed to each other.

Wiring 261 from capacitor microphone 248a is led through passages between upper sound absorbing member 258 and the inner surface of the casing and between sound shield plate 255 and the inner surface of the casing. Wiring 261 is then led through wire passage openings 260a, 260b, 260c and 260d. A portion of the feed-back sound waves propagating from the speaker (not shown) advance in the direction of an arrow E as shown in FIG. 12. A majority of the propagating sound waves are reflected or blocked by node-like partition wall 259a. However, another portion is gradually attenuated through wire passage port 260a and comes out from the final wire passage served by opening 260d. A substantial portion of the propagating feed-back sound waves are blocked by partition walls 259a, 259b, 259c and 259d which form a labyrinth structure prior to the feed-back sound waves reaching sound shield plate 255. The propagating waves which reach sound shield plate 255 have a large specific gravity so that the sound wave energy is absorbed and is dissipated as heat. A part of the feed-back sound also leaks to the upper side of sound shield plate 255, but is absorbed by sound absorbing member 257.

Accordingly, only a slight portion of the feed-back sound reaches capacitor microphone 248a. Therefore, howling caused by a feed-back sound propagating through the inside of the casing is minimized and presents no substantial problem. The partition wall, labyrinth structure of apparatus 200, is integrally formed with cylindrical casing 252. The number of components is required compared to the microphone section of apparatus 100 is far less.

Figure 9C:
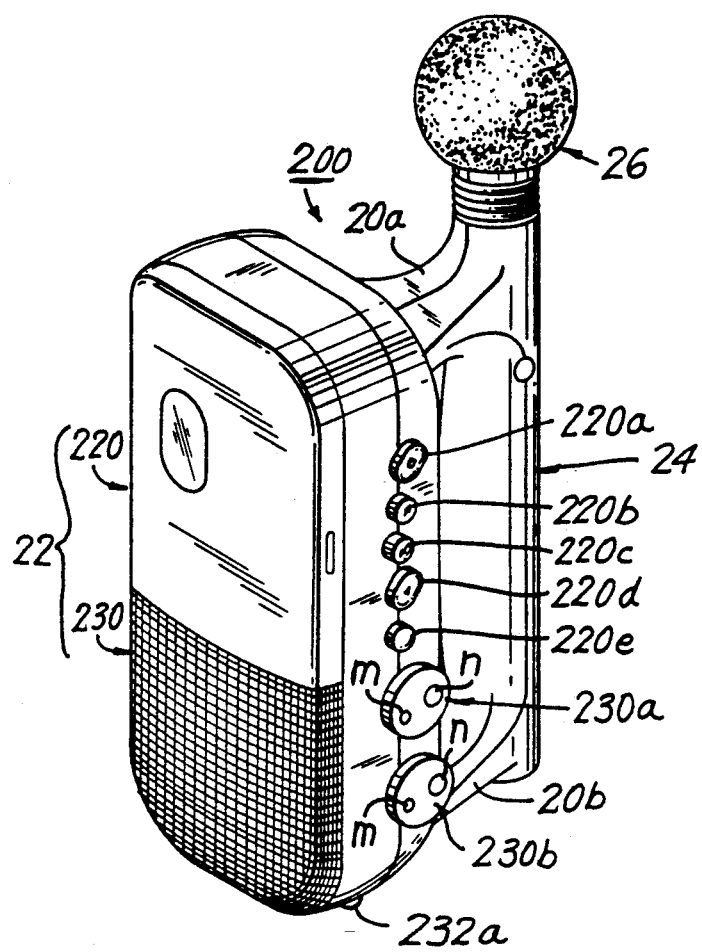
FIG. 9(c) is a perspective view of FIG. 9(a)
Figure 9D:
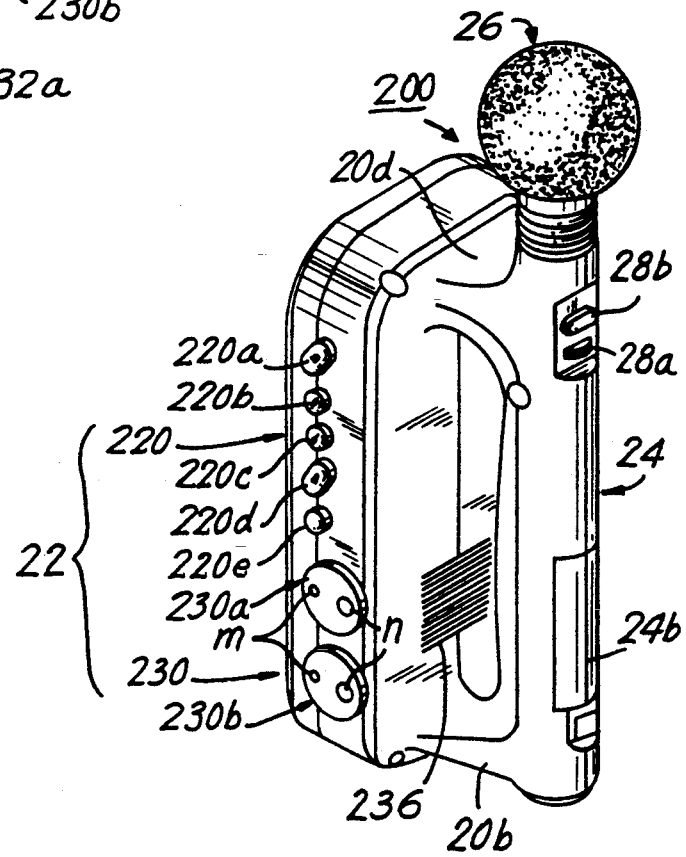
FIG. 9(d) is another perspective view of FIG. 9(a)
Figure 9E:
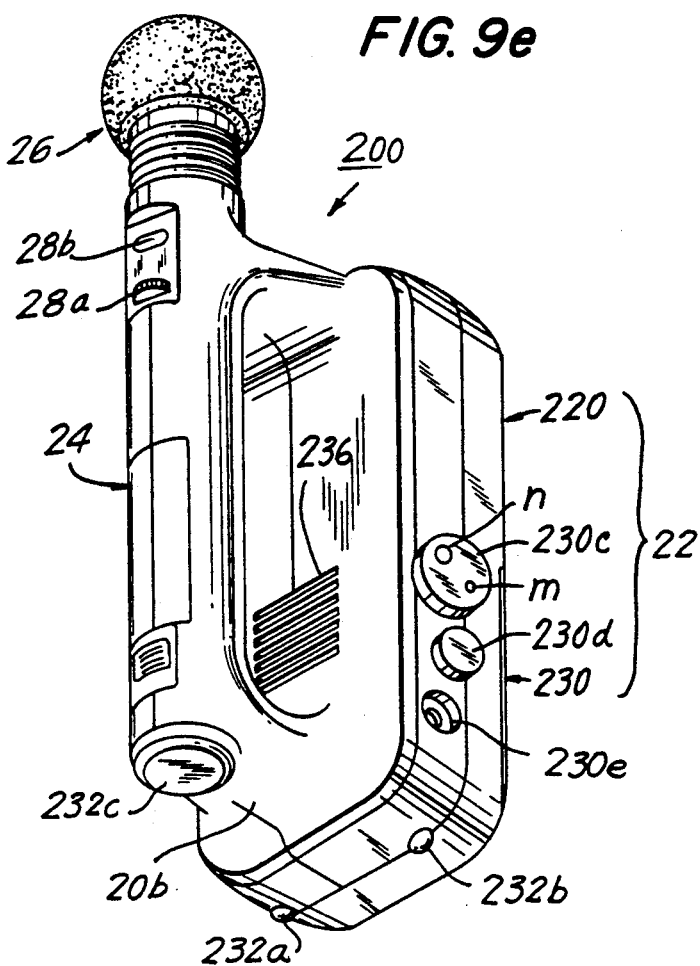
FIG. 9(e) is still another perspective view of FIG. 9(a)
Figure 9F:
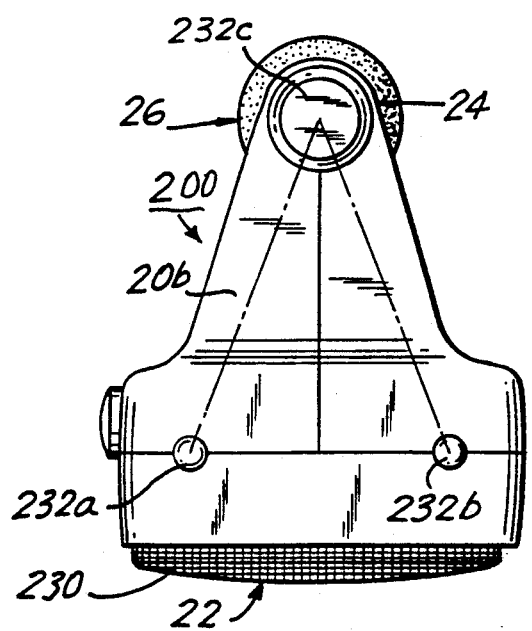
FIG. 9(f) is a bottom plan view of FIG. 9(a)

As shown in FIGS. 9(c) and 9(f), resilient leg parts 232a, 232b, having a diameter of about 1 cm and project from the left and right sides of the lower part of speaker storage section 230. Resilient leg part 232c has a diameter of about 3 cm and projects from the bottom part of grip section 24. Apparatus 200 can be set in a stationary posture with a three point support configuration as shown in FIG. 9(f). Apparatus 100 also has integrally formed leg parts 132a and 132b and is set with a three point configuration by two leg parts 132a, 132b and the bottom part of grip section 14. The stationary and self-standing stability of apparatus 100 are inferior to apparatus 200. The problems arise due to the bottom part of grip section 14 making contact with the surface of a table or the like. In addition, the casing of apparatus 100 is formed from hard materials so that direct contact with the surface causes slippage and instability.

Figure 13A:
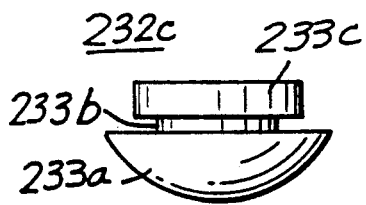
FIG. 13(a) is a front elevational view of a resilient leg.
Figure 13B:
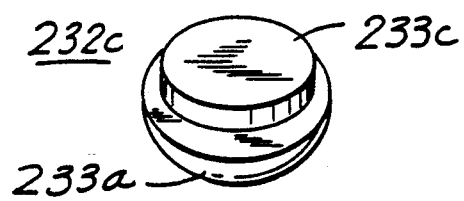
FIG. 13(b) is a perspective view of FIG. 13(a)
Figure 13C:
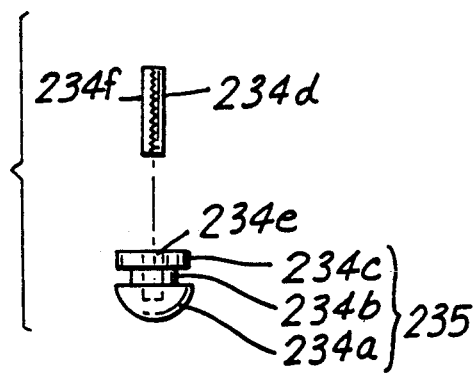
FIG. 13(c) is an exploded front elevational view of a small resilient leg.
Figure 13D:
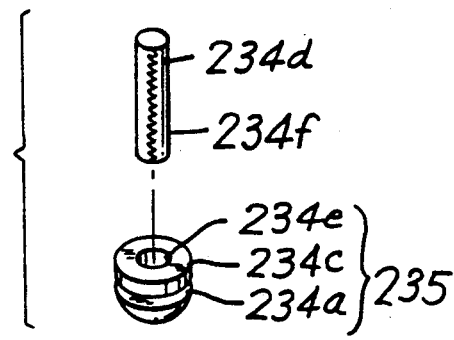
FIG. 13(d) is an exploded perspective view of FIG. 13(c)
Figure 14:
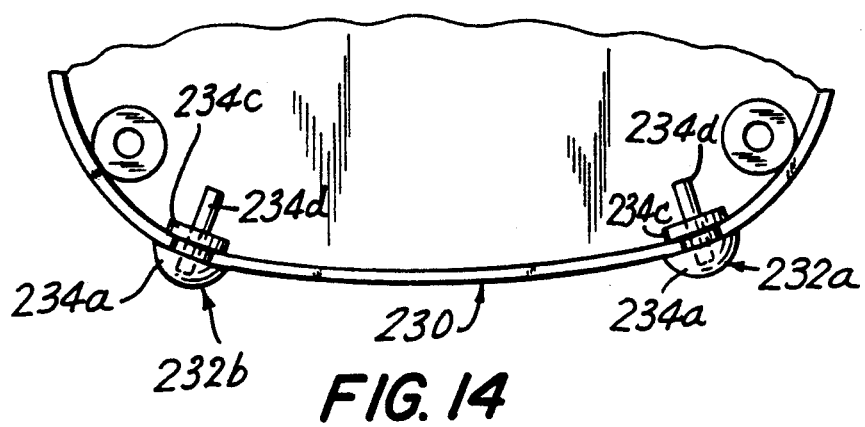
FIG. 14 is a partial front elevational view of FIG. 9(a)

With the configuration of apparatus 200, resilient leg parts 232a, 232b and 232c are attached to the casing. However resilient leg parts 232a, 232b and 232c are not integrally formed with the casing. To improve the stationary and standing stability, reference should now be made to FIGS. 13(a) and 13(b) which shows a large diameter resilient leg part 232c made of rubber. Leg part 232c is further provided with a member 233a exposed on the outside of the casing, a neck-in part 233b held between the split edges of the casing and come-off check part 233c located in the housing. The small diameter resilient leg parts 232a and 232b are also made of rubber as shown in FIGS. 13(c) and 13(d). Leg parts 232a and 232b have a resilient member 235 composed of a sagittal member 234a exposed on the outside of the casing, a neck-in part 234b held between the split edges of the casing and a come-off check part 234c located in the casing.

Resilient member 235 is formed with a hole into which a core member 234d fits. Core member 234d is made of a steel pipe is formed in its peripheral surface with a zig-zag split 234f. Zig-Zag split 234f adds strength to core member 234d, since the latter is inferior in durability and likely to be damaged in view of its small diameter. Further, zig-zag split 234f, formed in core member 234d, also has an anchoring function for preventing core member 234d from coming off of resilient member 235 and can supply additional resiliency to core member 234d. The leg part structure of apparatus 200 is designed so that bumps and vibrations transmitted from the contact surfaces of the leg parts ca be elastically relieved. Bumps affecting the electronic parts in apparatus 200 can be restrained. Therefore, it is possible to provide an apparatus which has a low failure rate and a high durability. Further, since the frictional coefficient between rubber leg parts 232a, 232b and 232c and the contact surface is high in comparison with the leg part structure of apparatus 100, slippage is decreased on the contact surface associated with apparatus 200. Therefore, it is possible to prevent unexpected overturning of apparatus 200.

Figure 15:
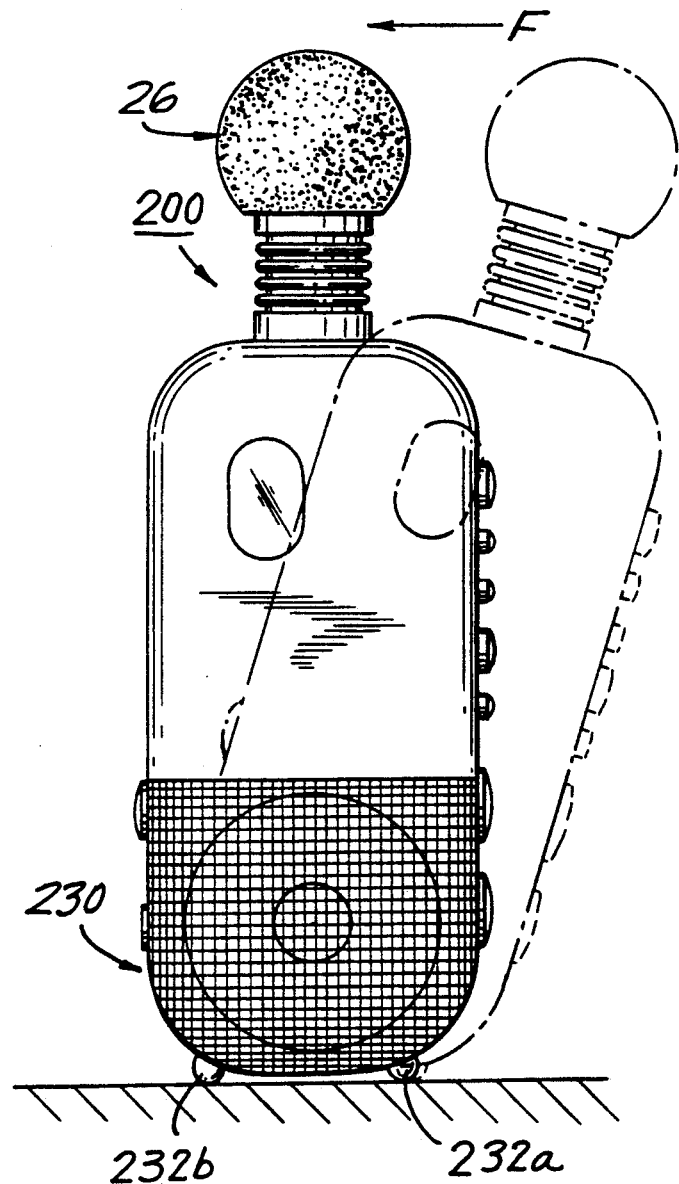
FIG. 15 is a front elevational view illustrating the stability of the apparatus of FIG. 9(a)

For example, as shown in FIG. 15, even though apparatus 200 is slightly inclined in the direction of arrow F, apparatus 200 can recover to the upright standing posture with a tumbling action. This is possible, due not only to the above mentioned features of the leg parts, but is also due to the low center of gravity created by the heavy weight of the speaker. This recovery can effectively prevent apparatus 200 from overturning, and hence reduce the possibility of damage or the like to apparatus 200. With this configuration, apparatus 200 can be easily set on a table or the like without sufficient attention or fear that it will fall off the table.

Figure 10:
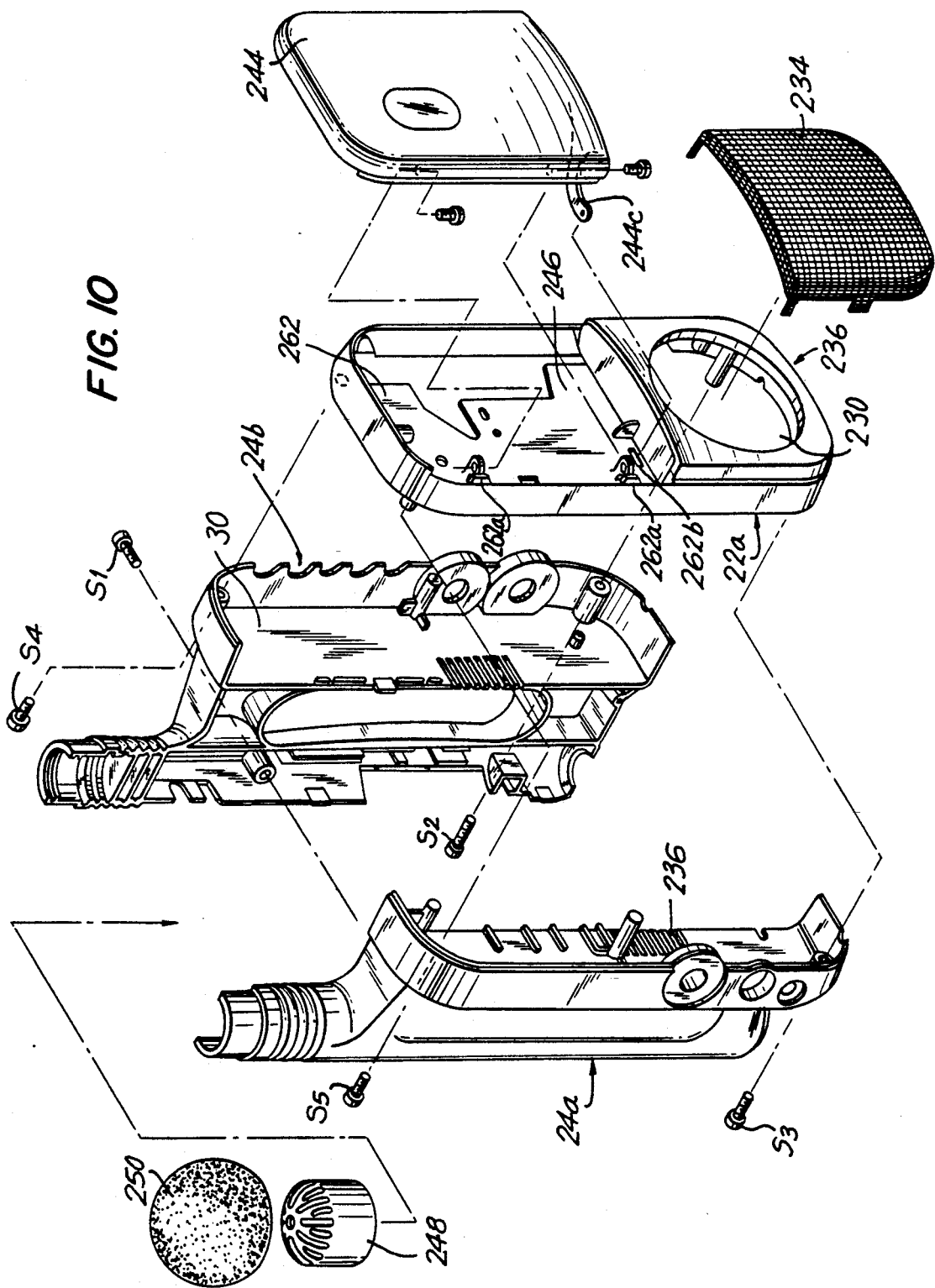
FIG. 10 is an exploded perspective view of FIG. 9(a)
Figure 16:
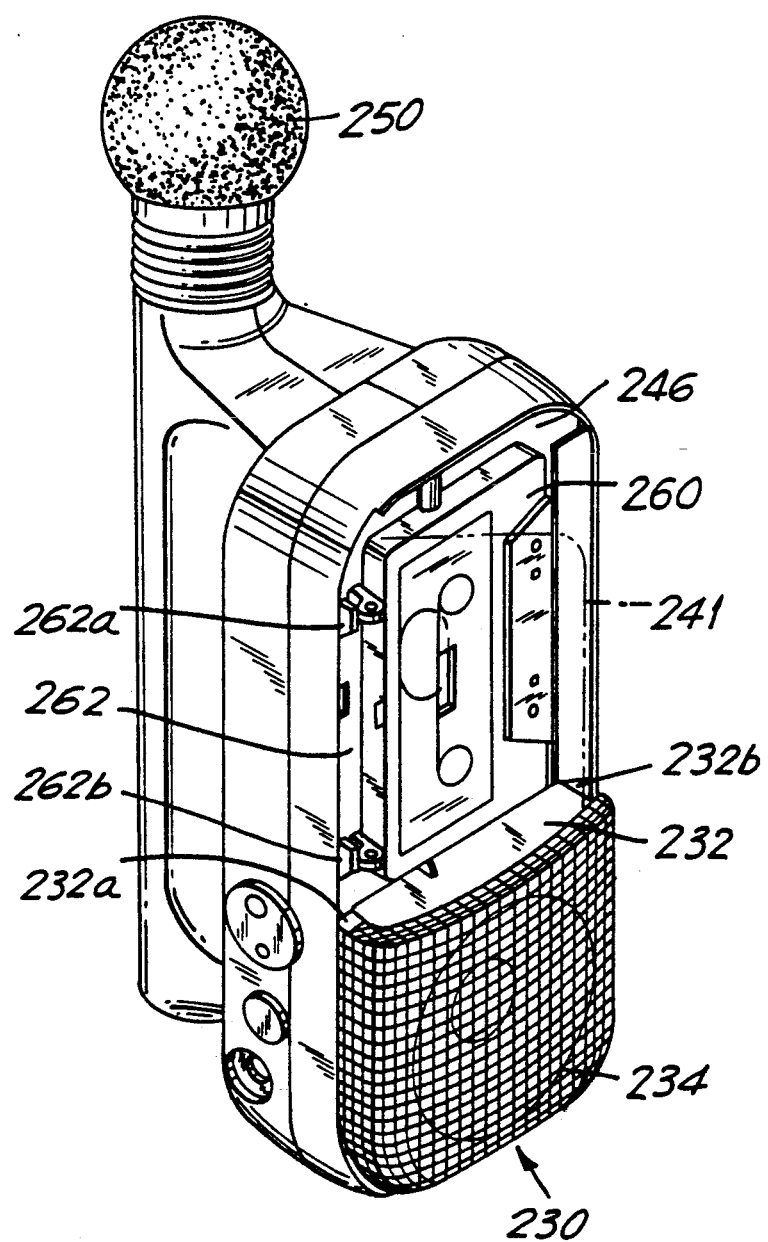
FIG. 16 is a perspective view of FIG. 9(a) with the cover removed.

Reference is now made to FIG. 16 wherein tape cassette 260 is loaded in tape cassette storage chamber 246. A cover 244 is shown open (and removed) and is represented by the phantom dotted lines. When tape cassette 260 is loaded, an extra space exists in tape cassette storage chamber 246. Storage chamber 246 is also functioning as an extension of a speaker acoustic space, similar to cassette storage chamber 146 in apparatus 100. Partition wall 232 separates speaker storage section 230 from cassette storage chamber 246 and is formed with sound communication holes 232a and 232b at both ends. Referring to FIGS. 10 and 16, chassis 262 includes openings 262a and 262b separating tape cassette storage chamber 246 from a deck storage chamber 30. Deck storage chamber 30 stores a rear side tape deck and electronic parts packaged on a board. Communicating holes 232a, 232b and openings 262a, 262b allow the extra space in the tape cassette storage chamber 246 in which the tape cassette is loaded to additionally serve as an acoustic space for the speaker.

Figure 17:
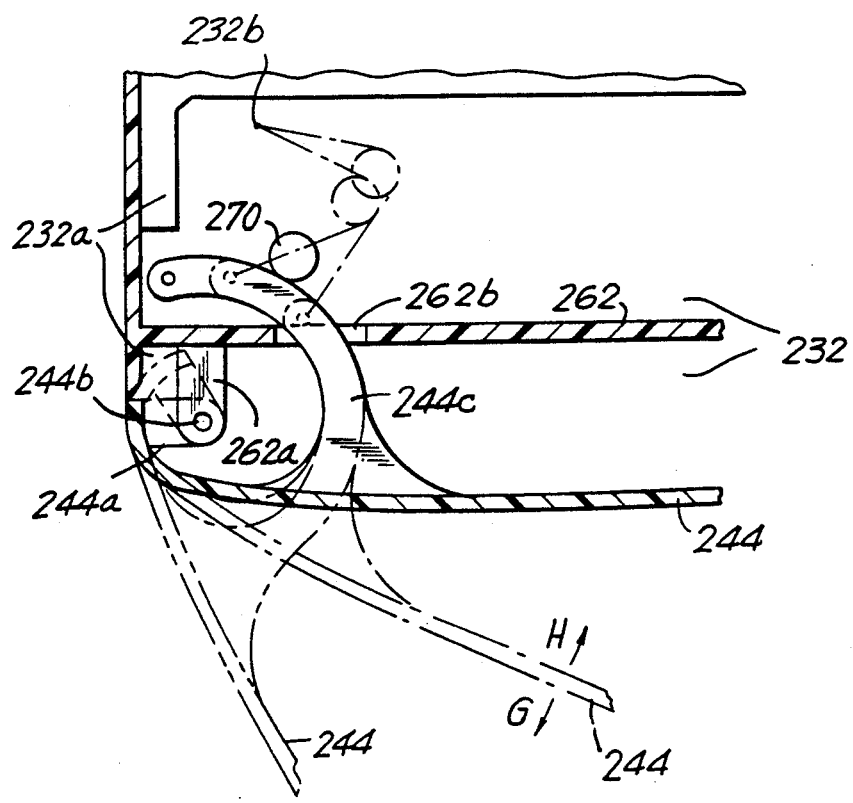
FIG. 17 is a partial perspective view of the hinge configuration for the cover of FIG. 16.

Openings 262a and 262b are integrally incorporated with chassis 262 and a pair of support parts 244a of opening and closing cover 244 are coupled together by a pin 244b, as shown in FIG. 17. Accordingly, cover 244 may be placed in a mid-opening position indicated by the one-dot chain line in FIG. 17 and a full open position indicated by the two-dot chain line in the same figure. Cover 244 is integrally incorporated with a spiral arm 244c which pierces a through-hole 262b formed in chassis 262. In this manner, cover 244 has its front end part entering into the deck storage chamber 30. A one-turn torsion spring 270 is hooked at both ends in a hooking hole 232b formed in partition wall 232 on deck storage chamber side 30 and in a hooking hole 244d formed in the front end part of spiral arm 244. Under the action of torsion spring 270, a self-opening and self-closing force for cover 244 can be obtained. At the mid-opening position, as indicated by the one-dot chain line in FIG. 17, torsion spring 270 falls into a dead point condition. From this condition, if cover 244 is moved slightly in the direction of arrow G, cover 244 is automatically opened to the full open position, as indicated by the two-dot chain line. Correspondingly, if cover 244 is moved slightly in the direction of arrow H, cover 244 is automatically closed to a closed position as indicated by the solid line. Accordingly, cover 244 is always held at either the closed position, indicated by the solid line, or the full open position, indicated by the two-dot chain line.

The opening and closing mechanism of cover 244 allows tape cassette 260 to be loaded and unloaded without holding cover 244 with one hand during loading and unloading of tape cassette 260. Accordingly, apparatus 200 may be easily handled during loading and unloading of tape cassette 260. On the other hand, apparatus 100 requires the user to hold the device in a substantially horizontal posture during loading and unloading of the tape cassette since the opening and closing cover is operated under gravitational force. However, cover 244 of apparatus 200 may be held in its open position even though the apparatus is set in any posture since cover 244 is not dependent upon gravitational force facilitating the us of apparatus 200. A part of the spring wire of torsion spring 230 piercing through hooking hole 244d serves as a resilient stopper when cover 244 is open.

Figure 18A:
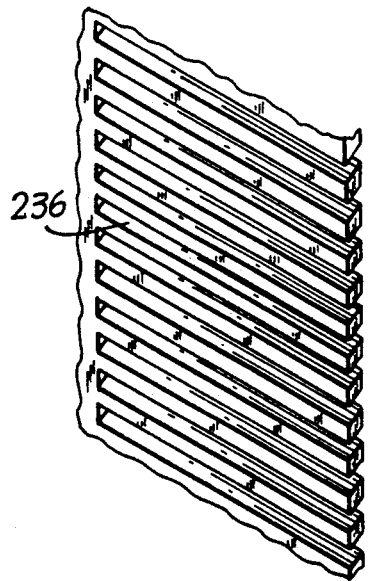
FIG. 18(a) is a perspective view of slit holes formed on the rear surface portion of the portable audio apparatus of FIG. 9(e)
Figure 18B:
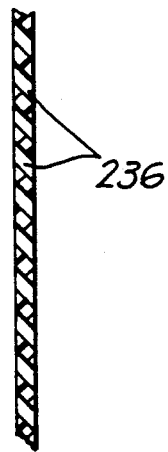
FIG. 18(b) is a side elevational view of FIG. 18(a)

Reference is now made to FIGS. 18(a), 18(b) and 10 wherein a plurality of slit holes 236 are formed on the rear side of body casing 22a. Slit holes 236 allow a person singing, who holds grip section 24 with one hand, to hear his song which is amplified by the speaker, similar to slit holes 136 in apparatus 100. Further, slit holes 236 allow the heat created by the electronic components to be radiated out of apparatus 200. Apparatus 200 differs from apparatus 100 in that slit holes 236 are directed toward lower coupling part 20b, as shown in FIGS. 18(a) and 18(b). This arrangement prevents speaker sound from propagating toward capacitor microphone 248a, and thereby prevents the occurrence of howling.

Figure 19:
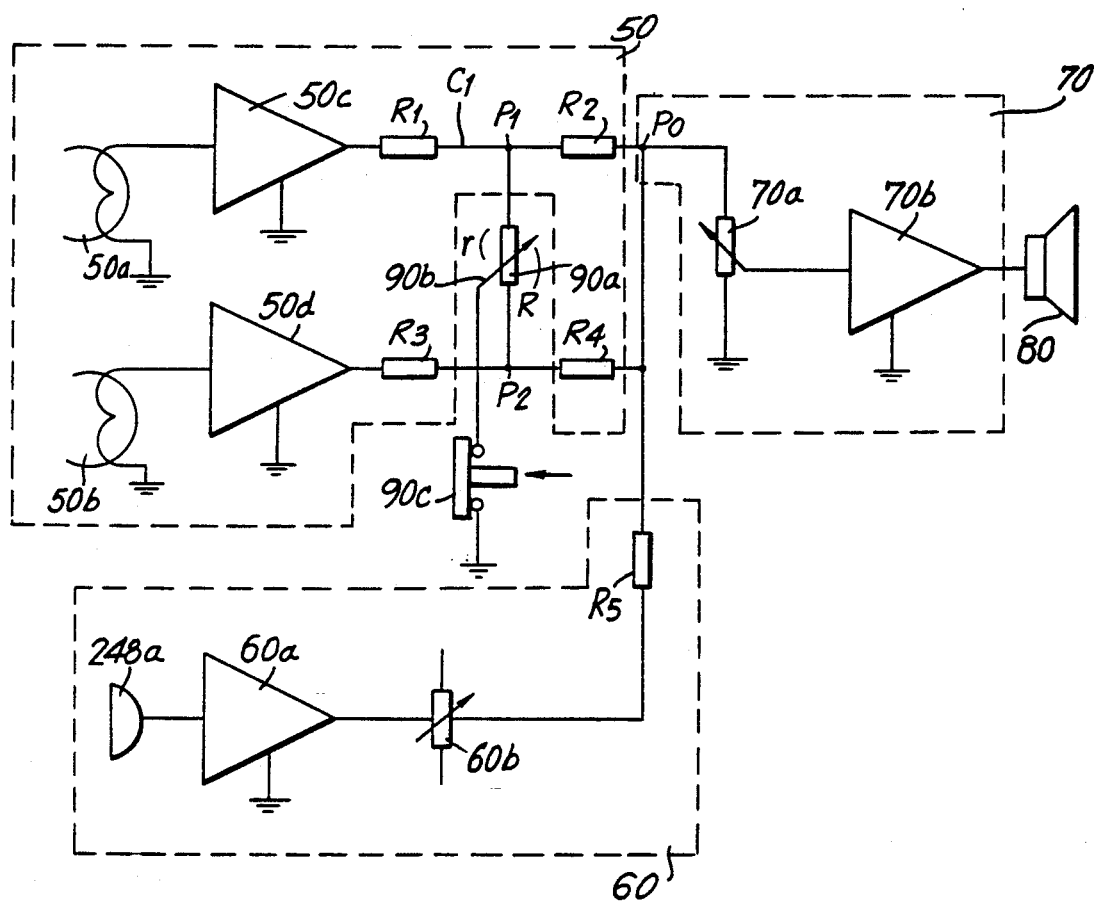
FIG. 19 is a circuit block diagram of the portable audio apparatus in accordance with the invention.

FIG. 19 is a circuit block diagram of portable audio apparatus 200 constructed in accordance with the invention. Either a sound multiplex tape cassette or other more conventional types of tape cassette (i.e. a tape cassette with recorded vocal sound) may be used. In addition, a tape cassette for use with singing accompaniment wherein only music tunes are recorded, may also be used. The circuit arrangement of apparatus 200 using for exemplary purposes only a sound multiplex tape cassette will now be described.

Similar to typical singing accompaniment systems, apparatus 200 is composed of vocal sound reproducing system 50, vocal sound input system 60, mixing and amplifying system 70 and speaker 80 as a transducer. Vocal sound reproducing system 50 includes a vocal sound reproducing magnetic head 50a and music tune reproducing magnetic head 50b which are attached to the tape deck located in deck storage chamber 30. A reproduced weak sound signal is amplified by a preamplifier 50c and then supplied to a mixing and amplifying system 70 through a pair of resistors $R_1$ and $R_2$. Further, a reproduced musical tune signal is amplified by preamplifier 50d and then supplied to mixing and amplifying system 70 through a pair of resistors $R_3$ and $R_4$.

A vocal sound input system 60 includes capacitor microphone 248a, a preamplifier 60a for amplifying the weak input vocal sound signal, a volume adjusting element 60b and a resistor $R_5$. The amplified signal is then supplied to mixing and amplifying system 70 through volume adjusting element 60b and resistor $R_5$. Mixing and amplifying system 70 includes a combined sound volume adjusting element 70a coupled to volume adjusting dial 28a of FIG. 9(e) and power amplifier 70b as a driver for small size speaker 80.

After the sound multiplex tape cassette is loaded in tape cassette storage chamber 246, the user activates the play mode (i.e. reproducing mode) by pressing push button top 220d as shown in FIG. 9(c). The tape runs in the play mode. A reproduced vocal sound signal and the reproduced music tune signal are mixed together at a connecting point $P_0$ between resistors $R_2$ and $P_4$. Accordingly, the reproduced sound (i.e. the recorded vocal sound and the recorded musical tune sound) from the sound multiplex tape is outputted from speaker 80. When a person sings into microphone section 26, his voice is inputted through microphone 248a, amplified and then outputted from speaker 80, simultaneously with the reproduced sound.

A sound multiplex volume balance device 90a is disposed between connecting point $P_1$ of resistors $R_1$ and $R_2$, connecting point $P_2$ of resistors $R_3$ and $R_4$, and a normally closed push switch 90c. Closed push switch 90c is disposed between sliding element 90b of volume balance device 90a and a reference voltage level such as ground. Sound multiplex volume balance device 90a has a resistance R between points $P_1$ and $P_2$ and a resistance r between connecting point $P_1$ and sliding element 90b. A reproduced vocal sound signal $C_1$ is outputted by resistor $R_1$. Signal $C_1$ then splits traveling through resistor $R_2$ into mixing and amplifying system 70 and through volume balance device 90a, sliding element 90b and push switch 90c to ground. In traveling (leaking) to ground though volume balance device 90a, signal $C_1$ is attenuated through the resistance r. A reproduced musical tune signal $C_2$ which is outputted by resistor $R_3$. Signal $C_2$ then splits traveling though resistor $R_4$ into mixing and amplifying system 70 and through volume balance device 90a, sliding element 90b and push switch 90c to ground. In traveling (leaking) to ground through volume device 90a, signal $C_2$ is attenuated through the resistance value of R-r. Accordingly, the balance between the reproduced vocal sound signal and the reproduced musical tune signal is adjusted based upon the position of sliding element 90b. If $r>$ R-r, the music tune sound is greater than the vocal sound, or vice versa.

If the user prefers not to listen to the recorded lyrics to a song, the vocal sound (i.e. vocal sound from a professional singer through magnetic head 50a) is restricted while the musical tune sound is increased (i.e., $r<<(R-r)$). Alternatively, if the recorded lyrics substantially without the recorded lyrics is desired, balance volume device 90a is adjusted so that $r>>(R-r)$.

A user may also wish to listen to the song with neither the lyrics nor musical tune attenuated by balance volume device 90a.

This listening mode is achieved by depressing push button top 28b which is linked to push switch 90c so that push switch 90c is opened. Sliding element 90b is no longer connected to ground. Therefore, attenuation of reproduced vocal sound signal $C_1$ and reproduced music tune signal $C_2$ is interrupted. The combination of signal $C_1$ and $C_2$ is now based, in part, on the predetermined resistive relationship between the scan of resistors $R_1+R_2$ and resistors $R_3+R_4$. In this manner, not only the musical tune sound, but also the vocal sound are outputted from speaker 80. A person singing who forgets the lyrics of a song by depressing push button top 28b (i.e., the vocal sound assist switch) receives vocal assistance from the recorded lyrics by a professional singer which is outputted from speaker 80. Therefore, by depressing push button top 28b, the volume of the recorded lyrics is reset to a predetermined level which corresponds to the volume of the musical tune. In other words, the decreased volume of the recorded vocal sound is reset to a normal operating volume so that a person singing can continue singing while following the recorded lyrics.

Figure 20:
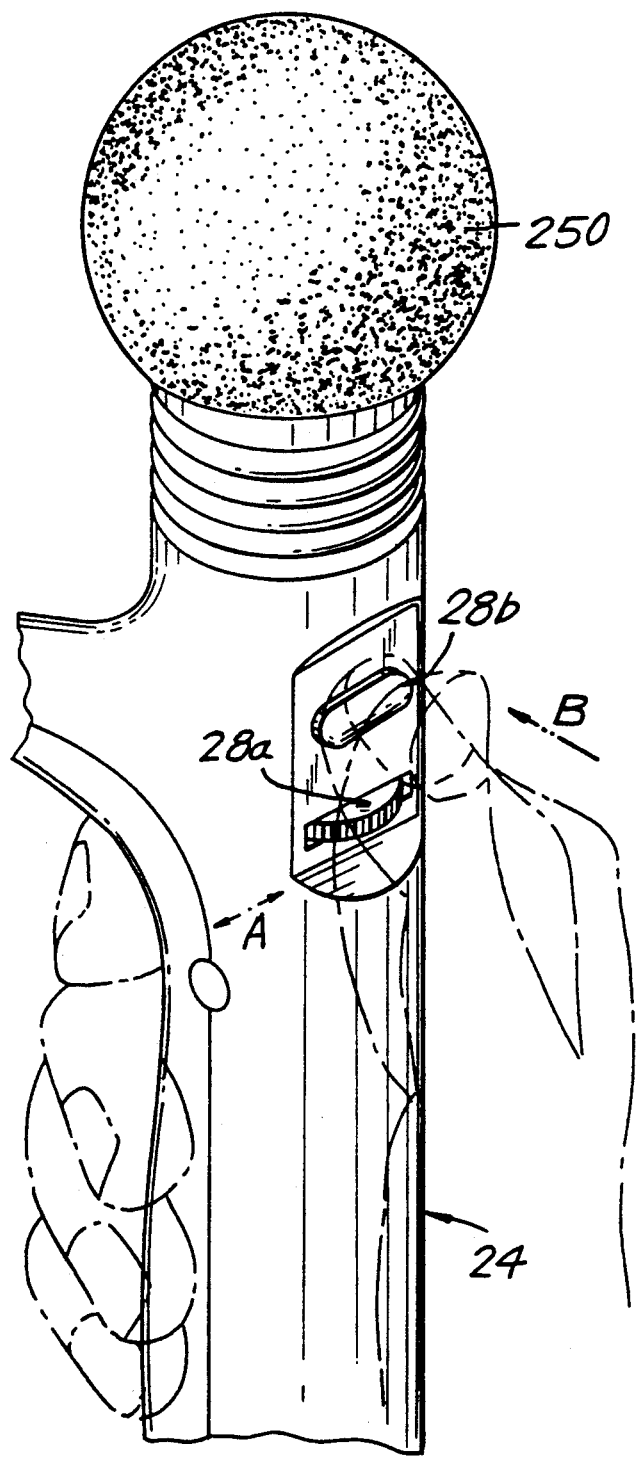
FIG. 20 is a partial perspective view illustrating thumb manipulation of the adjusting knobs of FIG. 9(d)

Reference is now made to FIG. 20 wherein push button top 28b for the vocal sound assist switch or the volume adjusting dial 28a is shown being manipulated by the user's thumb while holding grip section 24 by one hand. Volume adjusting dial 28a is located closer to grip section 24 than push button top 28b for vocal sound assist switch 28c. A manipulative force to volume adjusting dial 28a is in a direction indicated by the one-dot chain line arrow A shown in FIG. 20. A manipulation force to push button top 28b for the vocal sound assist switch 28a is in the direction indicated by the two-dot chain line arrow B also shown in FIG. 20. When volume adjusting dial 28a is turned, the flank of the thumb, indicated by the one-dot chain line, is brought into contact with dial 28a, while moving the thumb in the direction of the one-dot chain line arrow A. In this manner, the tip of the thumb can barely touch push button top 28b. Accordingly, there is no possibility of unexpectedly pressing push button top 28b since volume adjusting dial 28a serves as a fulcrum and the top of the thumb is naturally set apart from push bottom top 28b.

At the same time, when push button top 28b is manipulated by the pressure exerted by the thumb, the flank of the thumb makes contact with volume adjusting dial 28a. With this motion, the tip of the thumb moves in the direction of arrow B. Even though the flank of the thumb follows the direction of arrow B to press push button top 28b, dial 28a is not substantially turned. Since a pressing force in the direction of arrow B passes through the rotational center of dial 28a, there is only a minimum movement of dial 28a.

On the other hand, the positional relationship between volume adjusting dial 28a and push button top 28b for the vocal sound assist switch, as shown in FIG. 19, is such that if push button top 28b for the vocal sound assist switch is located closer to grip section 24 rather than volume adjusting dial 28, improved manipulatability is not achieved. In this configuration, there is also a small risk of pressing push button top 28b simultaneously with the turning of volume adjusting dial 28a. Further, the turning of volume adjusting dial 28a by the tip of the thumb is very difficult. In addition, when push button top 28b for vocal sound assist switch 90c is pressed, push button top 28b is difficult to press by the flank of the thumb. Push button top 28b must be pressed by the tip of the thumb. Accordingly, the user must press push button top 28b after the tip of the thumb is located at a position above volume adjusting dial 28a. Manipulatability is limited and can cause erroneous operation.

The relationship between volume adjusting dial 28a and push button top 28b is disclosed in FIG. 20 and requires no vertical shift of the tip of the thumb. Accordingly, the audio apparatus can be manipulated quickly and easily resulting in superior configuration with low possibility of erroneous operation. Manipulation of the audio apparatus can be made in the dark, without visually confirming the positions of push button top 28b and volume adjusting dial 28a resulting in a superior design.

Figure 21:
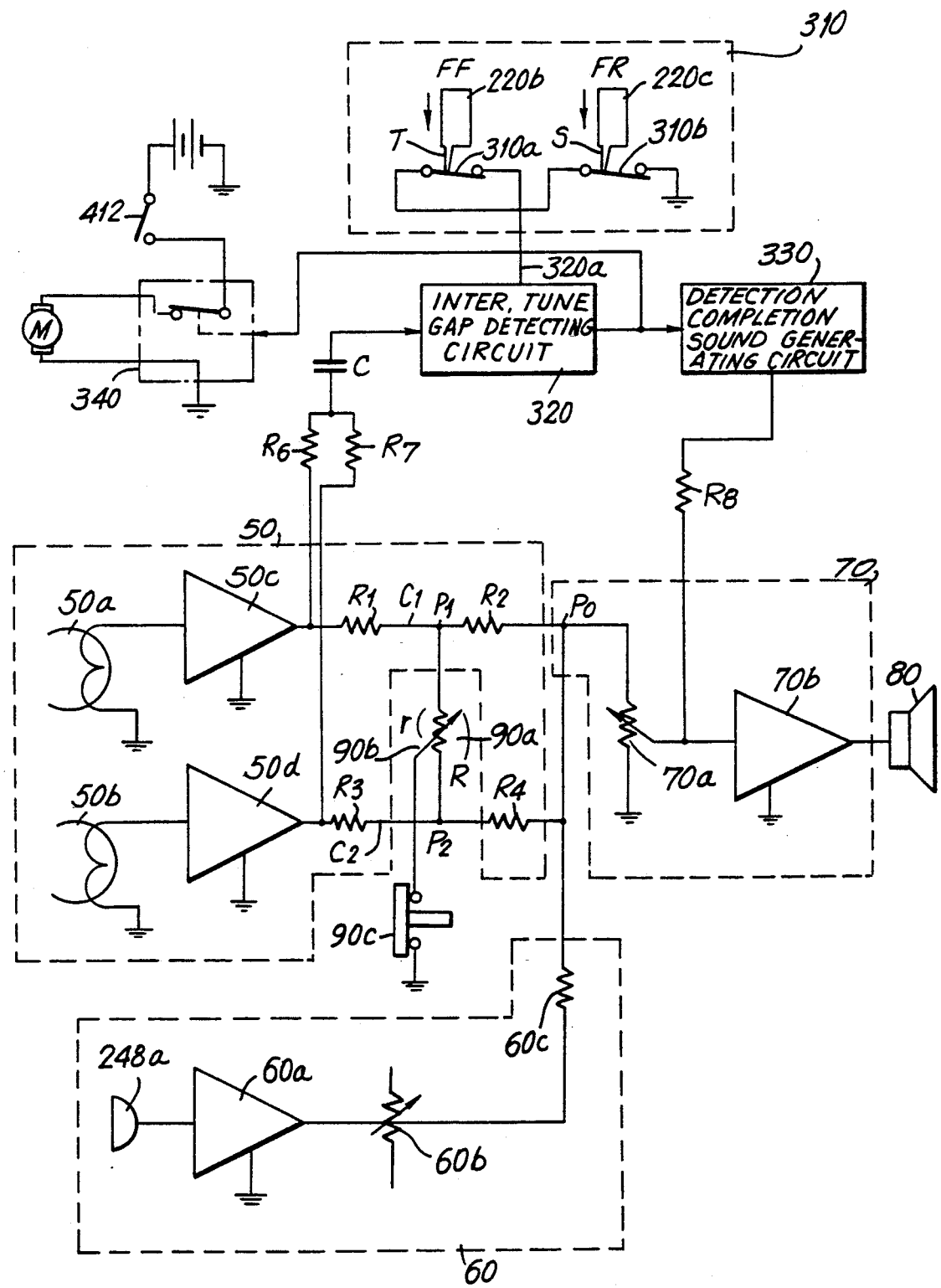
FIG. 21 is a circuit block diagram including the circuitry of FIG. 19 and for an automatic tune intro-scan operation starting device.

Reference is now made to FIG. 21 which discloses a circuit block diagram illustrating the basic circuit block of apparatus 200 shown in FIG. 19 and an electronic circuit system for an automatic tune intro-scan operation and starting device. Like reference numerals are used in FIG. 21 to denote those parts shown in FIG. 19 and the explanation thereof is abbreviated. The electronic circuit system for the automatic tune intro-scan operation and starting device includes an intro-scan operation starting circuit 310, an inter-tune gap detecting circuit 320, a detection completion sound generating circuit 330 and a motor stopping circuit 340. The intros-can operating starting circuit 310 is provided with leaf switches 310a and 310b electrically connected in series. The series circuit of leaf switches 310 and 310b is connected between a state selecting terminal 320a of the inter-tune gap detecting circuit 320 and ground. Leaf switches 310a and 310b are in a closed position during normal operation. Accordingly, state selecting terminal 320a of inter-tune gap detecting circuit 320 is at ground potential (i.e. low potential).

In this state, inter-tune gap detecting circuit 320 is held in a deenergized condition (i.e. stationary state). Leaf switch 310a is opened by pressing fast-feed push button top 220b such that projection T makes contact with push button top 220b. At the same time, leaf switch 310b is opened by pressing rewinding push button top 220c such that projection S makes contact with push button top 220c. When either leaf switch 310a or 310b is opened, state selecting terminal 320a of inter-tune gap detecting circuit 320 is at a greater potential than the ground potential. Therefore, inter-tune gap detecting circuit 320 is turned ON (i.e. active state).

Inter-tune gap circuit 320 has an active-high circuit arrangement in which a reproduced amplified vocal sound signal from preamplifier 50c is inputted through a resistor $R_6$ and a capacitor C and a reproduced and amplified music tune signal from preamplifier 50d is inputted through a resistor $R_7$ and capacitor C. Therefore, inter-tune gap circuit 320 receives the combined recorded vocal sound signal and the recorded musical tune signal and detects a nonsignal or a low level condition between adjacent songs. When the non-signal or low level condition is detected by inter-tune gap detecting circuit 320, a trigger signal is outputted to motor stopping circuit 340 and detection completion sound generating circuit 330.

Motor stopping circuit 340 stops the rotation of an electronic governor motor M for driving a reel in tape cassette 260 by applying the trigger (inter-tune gap detection) signal from inter-tune gap detecting circuit 320. At the same time, detection completion sound generating circuit 330 supplies an information signal or an artificial vocal sound signal to power amplifying device 70a through a resistor $R_8$ in response to receiving the trigger signal.

Figure 22:
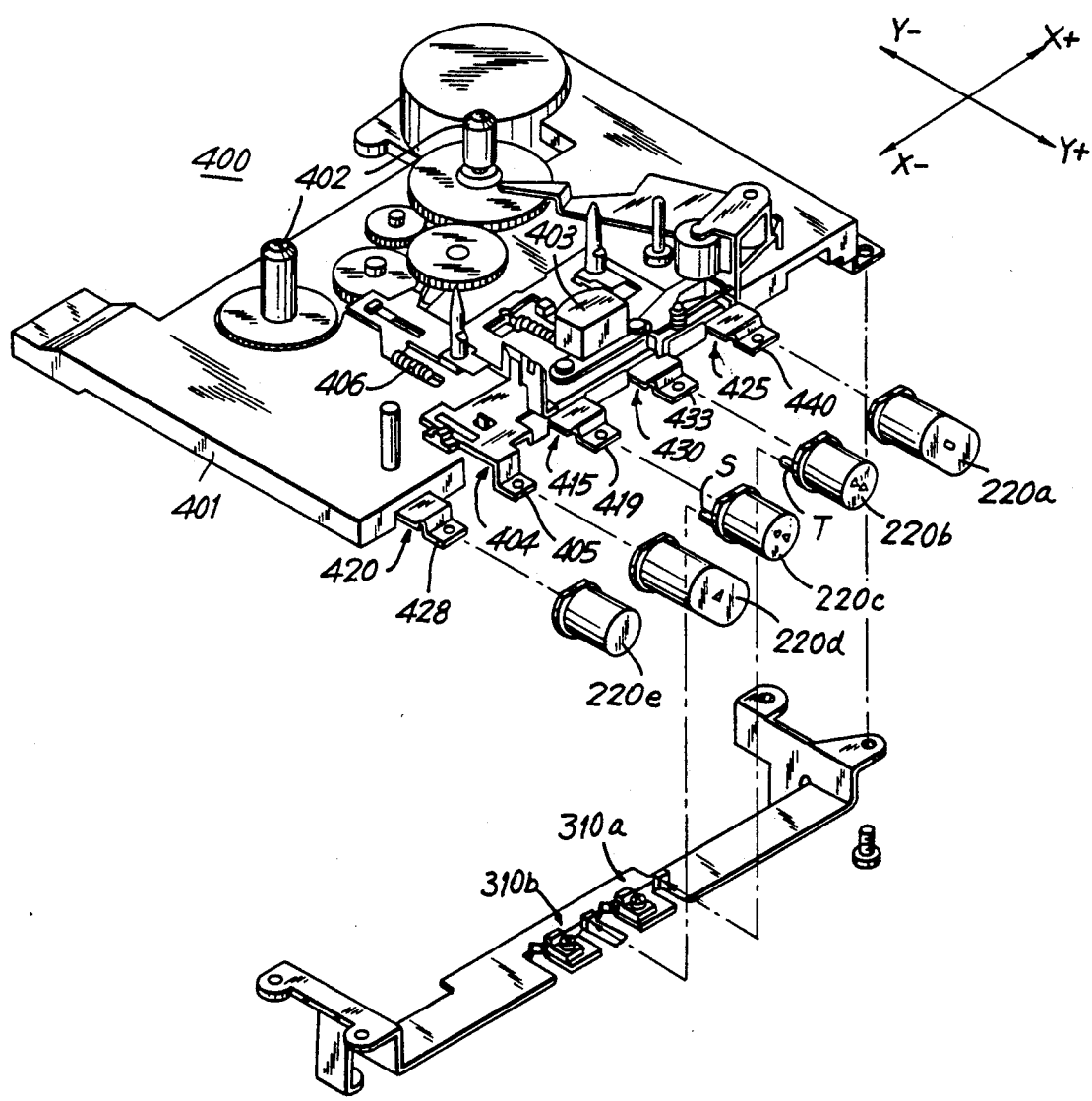
FIG. 22 is an exploded perspective view of the tape deck of FIG. 9(a)

Reference should now be had to FIG. 22 which illustrates a mechanism relating to the circuit system of automatic intro-scan operation starting device 310, and FIGS. 23(a), 23(b), 23(c), 23(d), and 23(e) which depict the mechanism system in various operating states. A tape deck 400 is provided with components assembled to a front and a rear surface of a resin base board 401. Reel shafts 402 are projected from the rear surface of resin base board 401 and are inserted in reel holes of tape cassette 260 when the latter is loaded. A play lever 404 is provided with head assembly 403. Head assembly 403, including reproducing magnetic head 50a and music tune reproducing magnetic head 50b of FIG. 19, is slidably installed on resin base board 401 in direction $Y_+$ and $Y_-$. Play lever 404 has an engaging piece 405 onto which play (i.e. reproducing) push button top 220d is fitted. A coil spring 406 is stretched between play lever 404 and resin base board 401. The resiliency of coil spring 406 exerts a return force in the direction of arrow $Y_+$ to play lever 404.

Figure 23A:
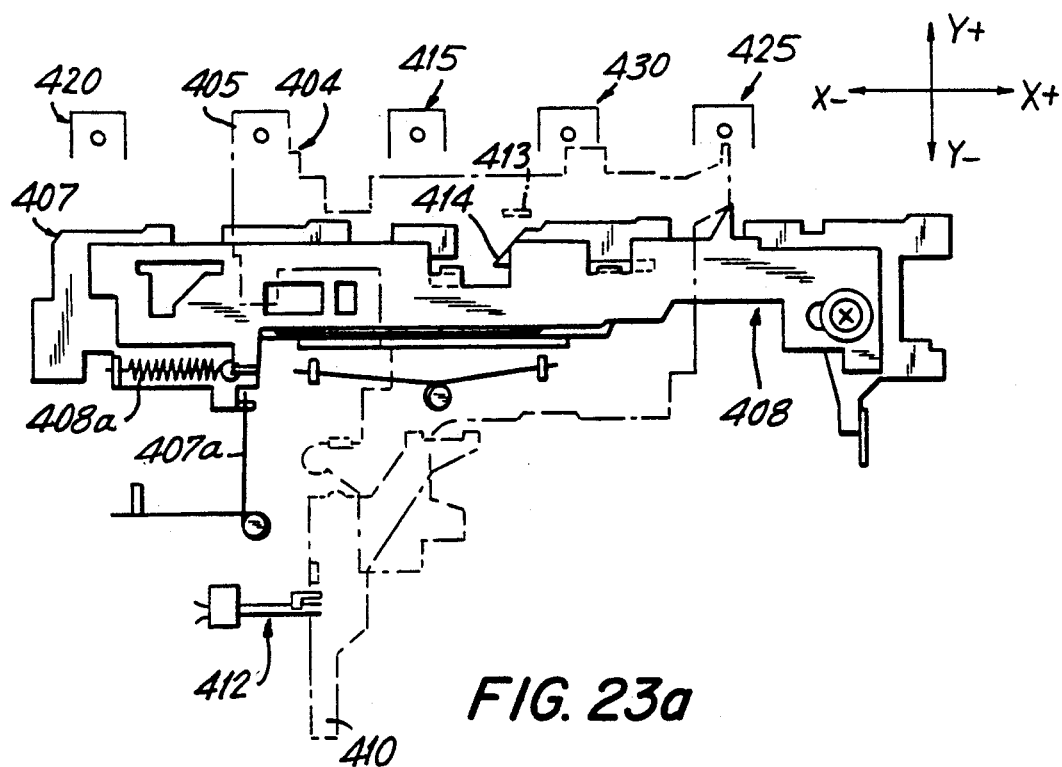
FIGS. 23(a), 23(b), 23(c), 23(d), 23(e) and 23(f) are plan views of the mechanism of FIG. 22.

As shown in FIG. 23a, a lower slide plate 407 and an upper slide plate 408 are attached to the rear surface of resin base board 401. Lower slide plate 407 is slidably adaptable in the directions of a pair of arrows $X_+$ and $X_-$. The resiliency of a torsion spring 407a exerts a return force in the direction of the arrow $X_-$ to lower slide plate 407. Upper slide plate 408 can be slidably directed on lower slide play 407 in the directions of arrows $X_+$ and $X_-$. The resiliency of coil spring 408a exert a return force in the of arrow $X_-$ to upper slide plate 408.

Figure 23B:
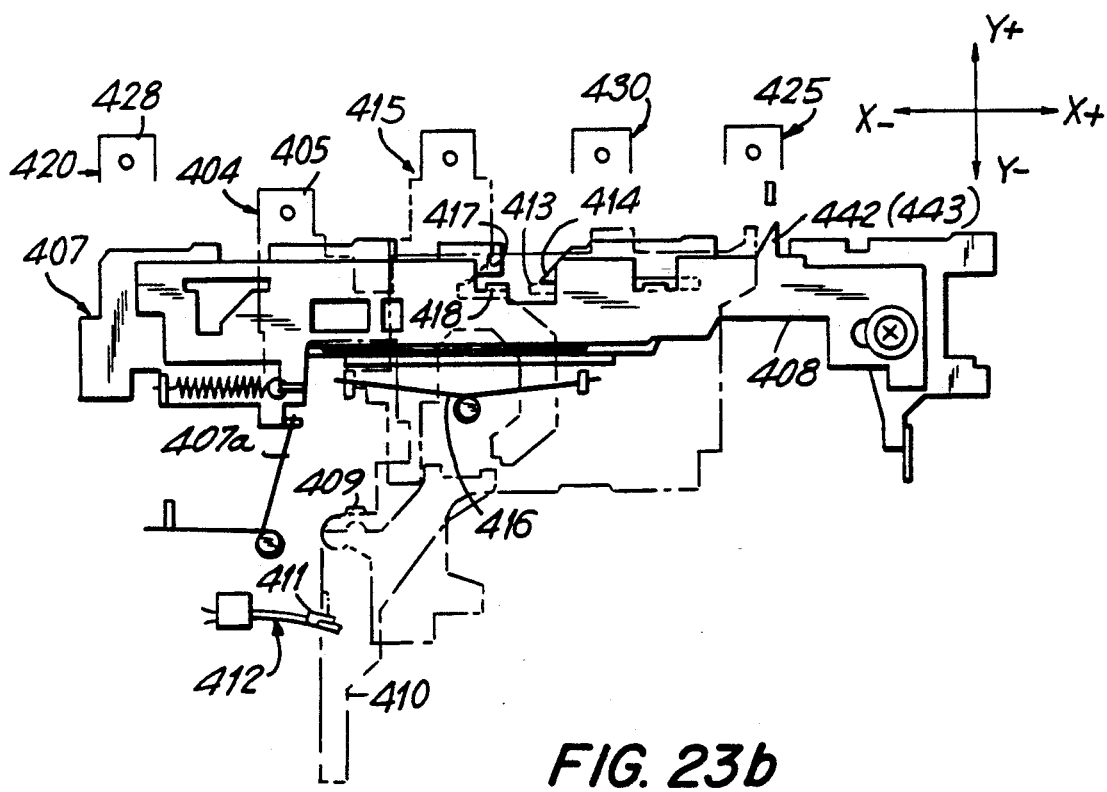

When play lever 404, indicated by the one-dot chain line in FIG. 23(b), is pressed in the direction of arrow $Y_+$, projection 409 pushes a slide plate 410, indicated by the two-dot chain line in FIG. 23(b), in the direction of arrow $Y_-$. This in turn causes projection 411 on slide plate 410 to close leaf switch 412. The closing of leaf switch 412 (which serves as a power switch) permits a power source voltage to be supplied to motor M and the accompanying circuit. Simultaneously, another projection 413 on play lever 404 presses an inclined surface of pawl part 414 of slide plate 407 to move lower slide plate 407 in the direction of arrow $X_+$. The exerted force overcomes the spring force of torsion spring 407a while being accompanied by upper slide plate 408. Accordingly projection 413 is engaged with pawl part 414 to lock play lever 404.

Figure 23C:
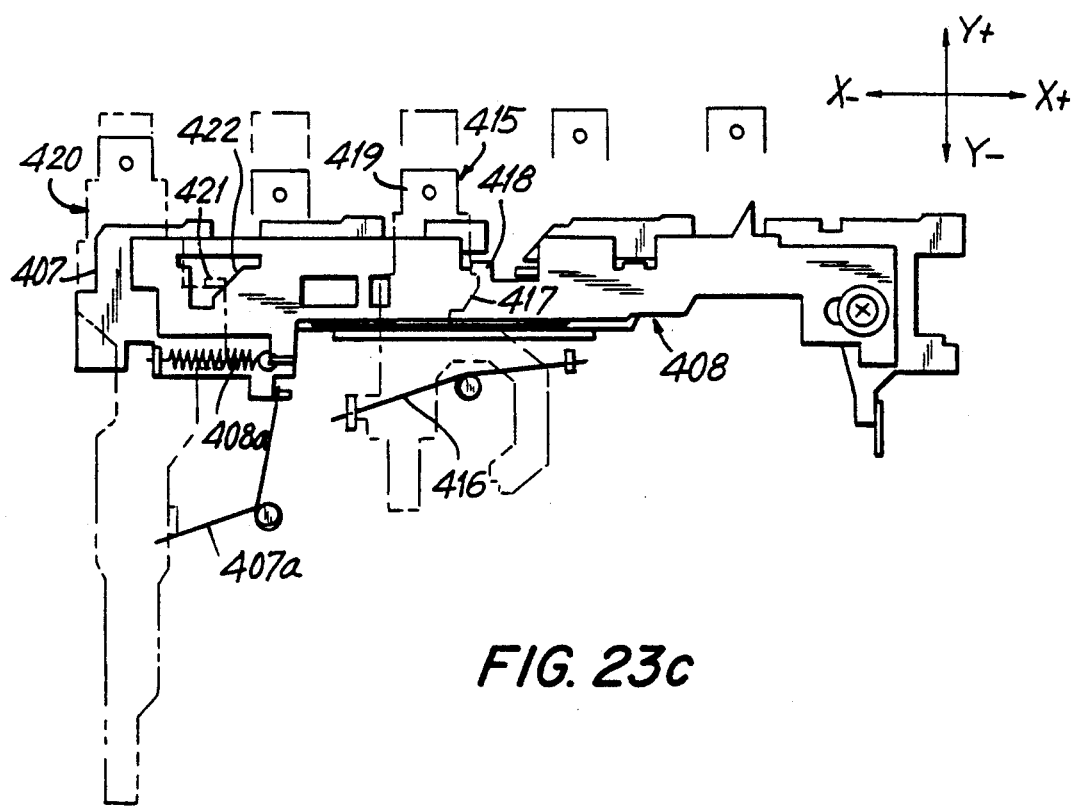

In the play mode, as shown in FIG. 23(c), when rewinding lever 415 is pushed in the direction of arrow $Y_-$ to overcome the spring force of torsion spring 416, the inclined surface of pawl part 417 presses a projection 418 on the upper slide plate 408. The pressure exerted to projection 418 causes upper slide plate 408 to move in the direction of arrow $Y_-$, relative to the lower slide plate 407 to overcome the spring force of coil spring 408a. Therefore, pawl part 417 is engaged with projection 418 to lock rewinding lever 415. Rewinding lever 415 has an engaging piece 405 onto which rewinding push button top 220C is fitted. By sliding rewinding lever 415 in the direction of arrow $Y_-$, pressing projection S on rewinding push button top 220c shown in FIG. 22 presses one of the contact pieces of leaf switch 310b and opens leaf switch 310b.

When leaf switch 310b is open, as shown in FIG. 21, the inter-tune gap detecting circuit 320 is energized. During reproducing and rewinding modes, the reproduced vocal sound signal and the reproduced music tune signal are inputted to inter-tune gap detecting circuit 320. Inter-tune gap detecting circuit 320 detects a non-signal or low level condition between adjacent songs. When a non-signal or low condition is detected, inter-tune gap detecting signal 320 supplies the trigger signal (inter-tune gap detection signal) to motor stopping circuit 340. When the inter-tune gap detection signal is supplied to motor stopping circuit 340, the rotation of electronic governor motor M for driving a reel is stopped. Simultaneously, detection completion sound generating circuit 330 supplies an information signal or an artificial voice signal to power amplifying device 70a through resistor $R_8$, applying the inter-tune gap detection signal as a trigger signal. Accordingly, the information signal or the artificial voice signal is outputted from speaker 80.

In conventional systems, when the inter-tune gap detecting signal is detected, a conventional tape recorder converts this signal into a mechanical drive force by means of a solenoid plunger of the like so as to actuate a release lever. The solenoid plunger releases play lever 404 or rewinding lever 415, thereby stopping motor M. To start the solenoid plunger, several amperes of current are quickly consumed. In some conventional tape recorders, the rewinding mode is electrically locked, consuming a large amount of power.

Automatic intro-scan operation circuit 310, however, stops motor M through motor stopping circuit 340, that is, by interrupting the power supply to motor M. In this manner, a large current necessary for driving the mechanism of the tape deck for releasing the push buttons is eliminated. In accordance with the invention, power consumption of the battery for powering the motor (especially during the rewind mode) and the speaker is carefully conserved to extend its life span. The intro-scan operation is achieved without resort to releasing of depressed switches through use of a solenoid plunger. The need to frequently replace batteries is avoided.

Figure 23D:
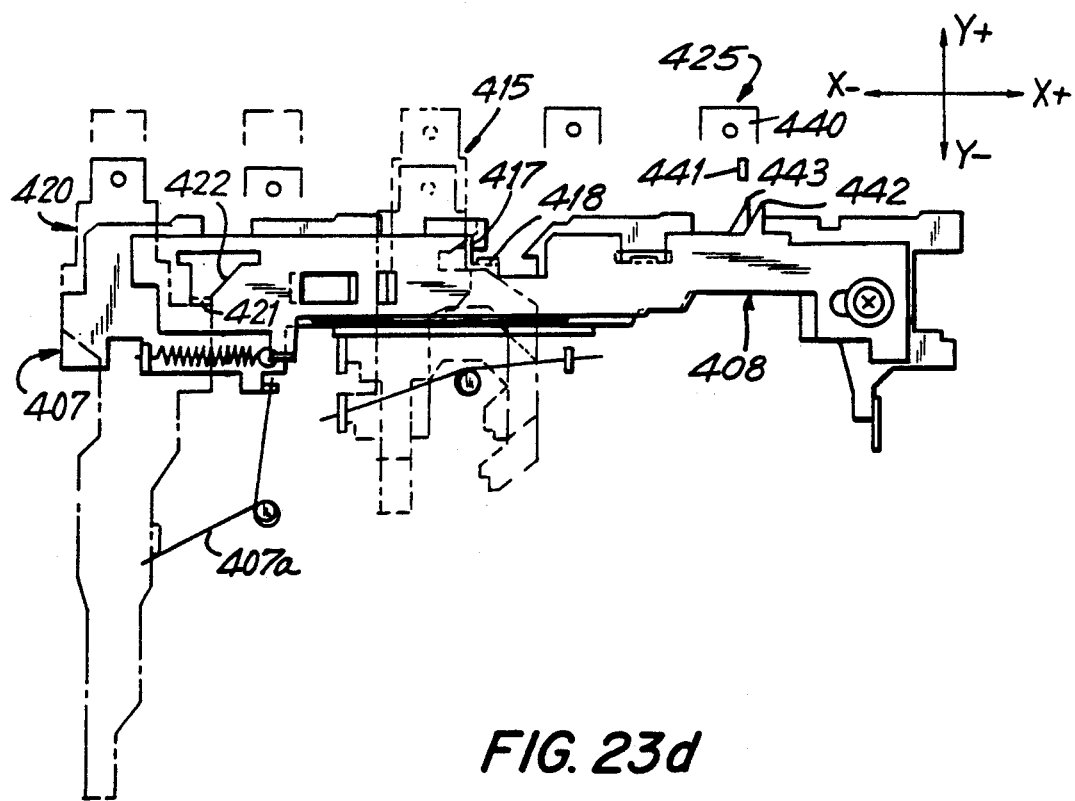
Figure 23E:
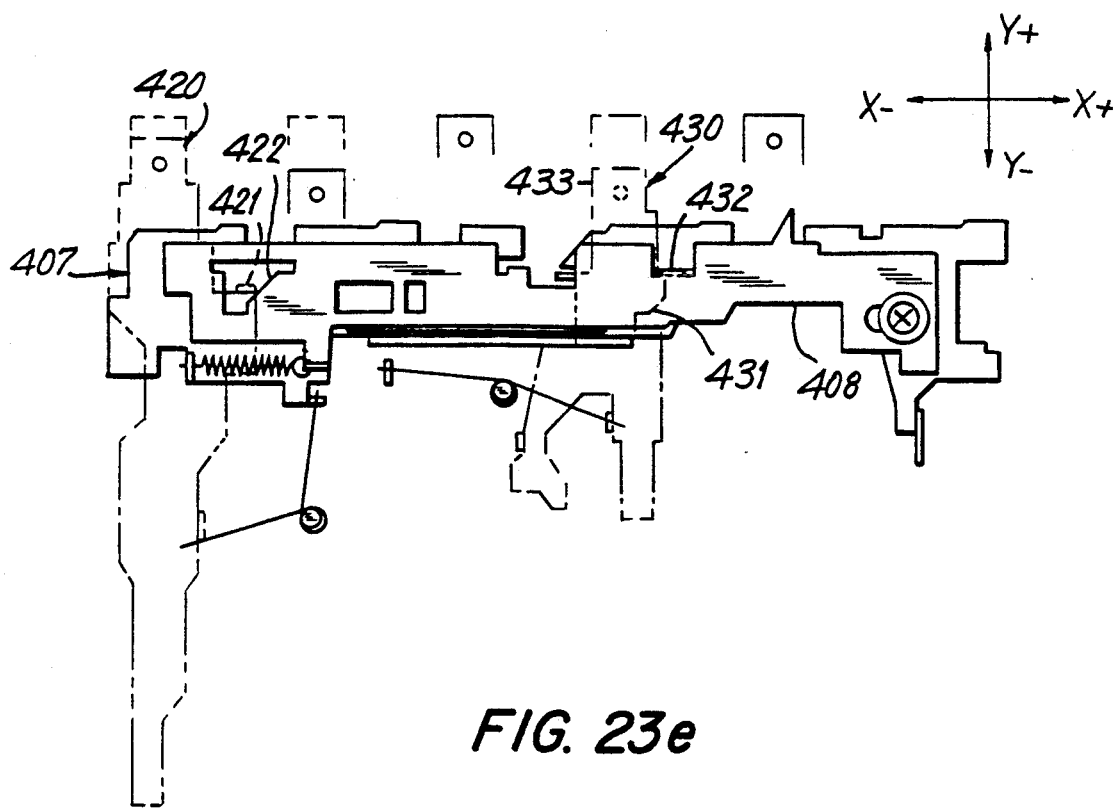

When information (e.g. artificial voice) indicating the completion of the intro-scan operation is outputted from speaker 80, the user may push start lever 420 shown in FIG. 23(c) in the direction of arrow $Y_-$. The pressing of start lever 420 overcomes the spring force of torsion spring 407a. A projection 421 is then pressed against an inclined part of opening 422 in upper slide part 408 to move upper slide plate 408 in the direction of arrow $X_+$. Accordingly, the engagement between pawl part 417 and projection 418 is released. Therefore, as shown in FIG. 23(d), rewinding lever 415 is returned in the direction of arrow Y to release the lock condition.

When rewinding lever 415 is returned in the direction of the arrow $Y_+$, pressing projection S moves away from one of the contact pieces of leaf switch 310b. Accordingly, leaf switch 310b is returned to a closed condition during normal operation. Since state selection terminal 320a of inter-tune gap detecting circuit 320 is at ground potential, inter-tune gap detecting circuit 320 is shifted into the inactive condition. Further, the stopping action of motor stopping circuit 340 is released. Motor M is again rotated to retrieve the play mode. After completion of the intro-scan operation, the mode is shifted into play mode by pushing start lever 420. It is not necessary to manipulate the push-in operation of play lever 404 immediately after the push-in operation of release lever 425. Accordingly, initiating the start operation after completion of the intro-scan operation can be simply achieved.

Information such as, but not limited to, an artificial voice provided by speaker 80, after initiating the rewind mode (caused by the push-in operation of rewinding lever 415) indicates that a ga between the present and previous song has been detected (e.g. heading of the previous music tune detected). When start lever 420 is no longer depressed, start lever 420 is automatically returned to the position shown in FIG. 23(b) by the spring force of torsion spring 407a. Accordingly, the play mode is once again begins. Start lever 420 has an engaging piece 428 onto which start push button top 220e is fitted.

Figure 23F:
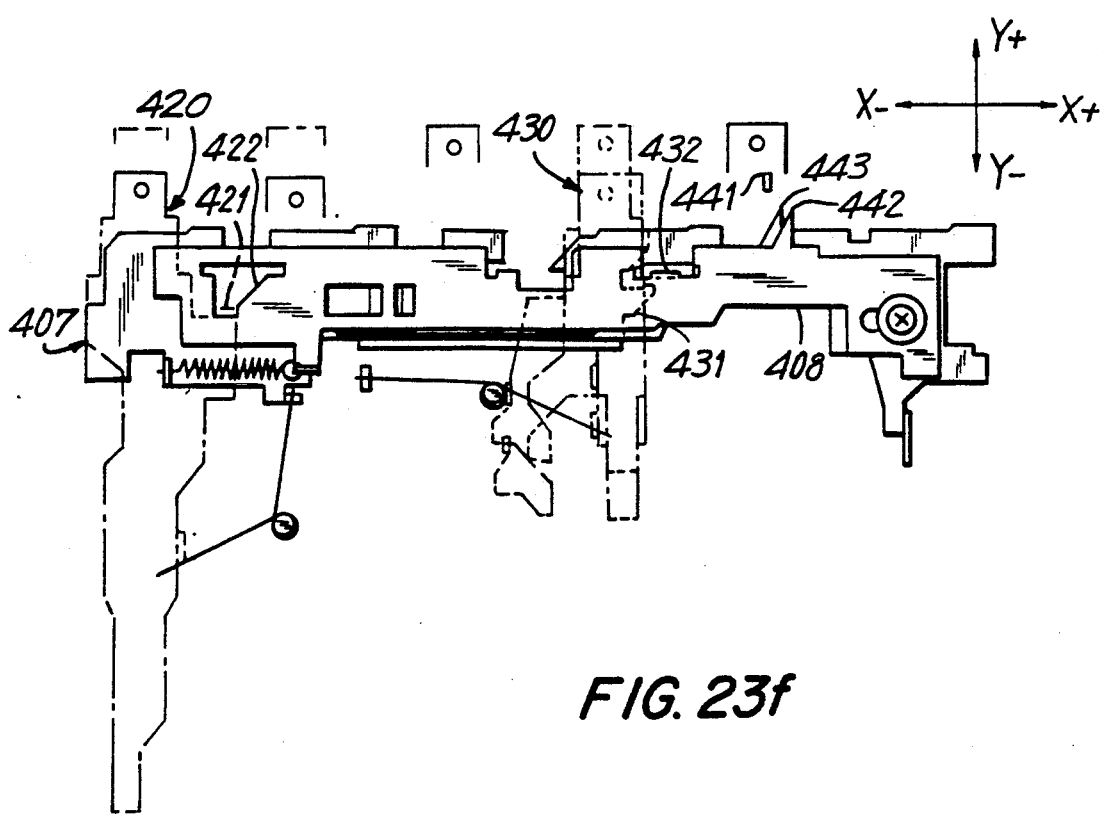

When fast-feed lever 420 is pushed in the direction of arrow $Y_-$ to overcome the spring force of torsion spring 416 from the reproducing condition shown in FIGS. 23(c) and 23(f), an inclined part of pawl part 431 presses a projection 432 on upper slide plate 408. This motion causes upper slide plate 408 to move in the direction of arrow $Y_+$ to overcome the spring force of coil spring 406 relative to lower spring 407. Therefore, pawl part 431 engages with projection 432 so that fast-feed lever 430 is locked. Fast-feed lever 430 has an engaging piece 433 onto which the fast-feed push button top 220b is fitted. During the process of sliding fast-feed lever 430 in the direction of arrow $Y_+$, pressing projection T on fast-feed button top 220b shown in FIG. 22 presses one of contact pieces of leaf switch 310a causing the opening of leaf switch 310a.

When leaf switch 310a is open, similar to opening leaf switch 310b, inter-tune gap detecting circuit 320 is energized to carry out the automatic intro-scan operation. After the information sound (e.g. artificial voice) is outputted from speaker 80, start lever 420 is pushed in the direction of arrow $Y_-$. This movement overcomes the spring force of torsion spring 407a. Then, projection 421 presses the inclined part of opening 422 in upper slide plate 408 to move upper slide plate 408 in the direction of arrow $X_+$. Engagement between pawl part 431 and projection 432 is released and fast-feed lever 430 is returned in the direction of arrow $Y_+$, as shown in FIG. 23(f), to release the lock condition. When fast-feed lever 430 is returned in the direction of arrow $Y_+$, pressing projection T moves away from one of the contact pieces of leaf switch 310a to close leaf switch 310a.

Therefore, state selection terminal 320a of inter-tune gap detecting circuit 320 is at a ground potential so that inter-tune gap detecting circuit 320 is shifted to the deenergized state. The output of information sound or artificial voice sound caused by the push-in operation of fast-feed lever 430 supplies information to the intro-scan operation including the lead of the next musical signal. In this manner, jumping (skipping) over a song can be achieved. When the pressure against start lever 420 is released, start lever 420 is automatically returned to the condition shown in FIG. 23(b) by the spring force of torsion spring 407a. Accordingly, the play mode once again begins. Start lever 420 has an engaging piece 428 onto which the start push button top 220e is fitted.

Release lever 425 has an engaging piece 440 onto which the release push button top 220a is fitted. Release lever 425 is urged in the direction of arrow $Y_+$ by the spring force of a torsion spring (not shown). Further, release lever 425 has a projection 441. Upper slide plate 408 and lower slide plate 407 have pawl parts 442, 443 against which projection 441 abuts, as shown in FIGS. 23(d) and 23(f) When release lever 425 is pushed in the direction of arrow $Y_-$ during play mode, projection 441 presses pawl parts 442, 443 against which projection 441 abuts. This pressure moves upper slide plate 408 and lower slide plate 407 in the direction of arrow $X_+$. Pawl part 414 releases the lock condition of play lever 404. Further, projection 441 on release lever 425 abuts against pawl parts 442, 443 to release the fast-feed condition and the rewinding condition, respectively, during the non-reproducing mode.

As can now be readily appreciated, a miniature portable audio apparatus having a speaker, a vocal sound reproducing device, a gripping section and a vocal sound input section is provided. The speaker is stored in a casing body in a first position in the apparatus. In addition, the other parts of the vocal sound reproducing device are disposed in the casing body. The gripping section is provided with a plurality of parts which are integrally coupled to form the casing. The vocal sound input section is coupled to the gripping section and the casing at a second position. In this arrangement, the vocal sound input section is arranged at a specified distance from the speaker to prevent howling.

In accordance with the invention, the portable audio apparatus includes a vocal sound reproducing device having a sound multiplex reproducing device. The sound multiplex reproducing device includes a vocal sound reproducing circuit and a music tune reproducing circuit in order to provide the singing accompaniment function. The audio apparatus further includes a mixing and amplifying device, a signal intensity changing device and a signal intensity setting device. The mixing and amplifying device mixes a vocal sound reproduction signal from the vocal sound reproducing circuit and a music tune reproduction signal from the tune reproducing circuit and then amplifies the mixed signals. The signal intensity changing device changes at least the intensity of a vocal sound reproduction signal supplied to the mixing and amplifying device in association with external manipulation. Further, the signal intensity setting device disables the signal intensity changing means based on external manipulation. The signal intensity device sets the intensity of the vocal sound reproduction signal fed to the mixing and amplifying device at a predetermined value.

The signal intensity changing device adjusts the intensity of the vocal sound reproduction signal to set a balance between a vocal sound volume and a music tune sound volume. In this manner, when recorded vocals are introduced through the vocal sound input section, an increased sound is obtained by adjusting the volume of the recorded lyrics. The recorded lyrics and tune are mixed and outputted from the speaker. By decreasing the volume of the recorded vocal signal through the signal intensity changing device, the user can sing along with his voice mixed with the reproduced song and outputted along with reproduced song through the speaker. A person who forgets the lyrics of a song or has no self-confidence to continue singing would activate the signal intensity setting device to reset the volume balance between the recorded lyrics and tune so that the listener can sing along by listening to the recorded lyrics. In resetting the volume balance, the signal intensity adjusting device for adjusting the intensity of a vocal sound reproduction signal is disabled. The volume of the recorded vocal sound reproduction signal can then be reset to a predetermined value. The voice of the user can also be produced by the speaker. Therefore, the person singing can continue to sing while playing the song.

The signal intensity changing device includes a first signal intensity attenuating circuit for variably attenuating the volume of the vocal sound reproduction signal and a second signal intensity attenuating circuit for attenuating the volume of the recorded music tune signal reproduction signal prior to being supplied to the mixing and amplifying device. Preferably, the attenuation circuitry is constructed from single variable resistor to reduce the number of components.

The signal intensity setting device includes a switch for interrupting signal attenuation by at least the first signal attenuating circuit. In the preferred embodiment, the switch is connected in series to a slider of a single variable resistor acting as a signal intensity changing device. If the switch device is formed from a push button type, the top of the push button is desirably positioned on the gripping section or in an area in the vicinity of the grip section. The thumb of the user can easily manipulate the push button which enhances the manipulatability of the apparatus.

To decrease the consumption of power from the battery to release the lock of the mechanism system upon completion of a tune intro-scan operation, the apparatus also includes an initiation signal generating circuit for generating a signal for initiating a tune intro-scan operation at the timing of a high speed forward feed operation or a rearward feed operation, an inter-tune gap detecting circuit for detecting a non-signal or low level condition of a reproduced song and a motor stopping circuit for interrupting the supply of power to a drive motor.

In a conventional arrangement, the lock condition mechanism system for a high speed forward feed operation and high speed rearward feed operation is forcibly released by a solenoid plunger or the like when an intertune gap detecting signal is delivered by pressing a push button. However, in the present invention, the mechanism system is held in its lock condition while at the same time the system is turned off. The motor stopping circuit cuts off the supply of power to the drive motor to electrically and directly stop the motor from rotating and drawing power from the battery. Accordingly, no substantial amount of current is consumed for stopping the motor and it is substantially possible to reducing consumption of the power source.

To transmit data to the user at the completion of a tune intro-scan operation, a detection complete sound generating circuit is provided for outputting an alarm sound or an artificial voice from the speaker in accordance with a detection signal produced by the intertune gap detecting circuit. The initiation signal generating device includes, for example, an AND circuit having a first switch which opens and closes in association with a high speed forward feed operation and a second switch which opens and closes in association with a rearward feed operation. In the preferred embodiment, the first switch and second switch are leaf type switches.

In addition to a pushing member for each leaf type switch, a projection is provided on the rear side of a push button switch for each selecting mode lever. Although the drive motor is automatically stopped after completion of a tune intro-scan operation, the high speed forward feed or high speed rearward feed operation mechanism is held in a locked condition. Since, the initiation signal generating device is in its active condition. A mechanism is provided for stopping continuation of the initiation signal generation (which initiates a tune intro-scan operation). A start lever is also provided for releasing the locked conditions of a high speed forward feed operation selecting lever, a high speed rearward operating selecting lever and returning the apparatus to a reproducing mode. A push button projecting from the casing body fits onto an engaging piece of the start lever for restarting the reproducing mode through depression of one push button.

It will thus be seen that the objects set forth above, among those made apparent from the preceding description, are efficiently attained and, since certain changes may be made in the above constructions without departing from the spirit and scope of the invention, it is intended that all matter contained in the above description o shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A portable audio apparatus comprising:

sound reproducing means for producing a first signal and a second signal;

synthesizing means for combining said first signal with said second signal, said synthesizing means producing an output signal representing the combination of said first signal with said second signal;

adjusting means for varying the relative strength of the combination of said first signal to said second signal represented by said output signal by a single manual manipulation of said adjusting means; and control means having a first position to permit said adjusting means to vary the relative strength of the combination of the first signal to said second signal and a second position for setting said adjusting means to a predetermined combination of said first signal with said second signal.

2. The portable audio apparatus of claim 1, further including a housing for supporting said sound reproducing means within said housing, speaker means for producing an audio signal based o said output signal and disposed at a first position within said housing, sound input means for receiving sound waves, connected to said housing at a second position and distanced from said speaker means to prevent howling by the latter, and gripping means attached to said housing for holding said portable audio apparatus with at least one hand of a user.

3. The portable audio apparatus of claim 1, further including means for producing a third signal, said synthesizing means operable for adding said third signal to said output signal.

4. The portable audio apparatus of claim 2, wherein said sound input means produces a third signal, said synthesizing means operable for adding said third signal to said output signal.

5. The portable audio apparatus of claim 3, wherein said third signal is an audio signal representing the vocal sound waves of a user of said audio apparatus.

6. The portable audio apparatus of claim 4, wherein said third signal is an audio signal representing the vocal sound waves of a user of said audio apparatus.

7. The portable audio apparatus of claim 4, wherein said sound input means includes a microphone.

8. The portable audio apparatus of claim 1, wherein said adjusting means includes attenuating means for changing the magnitudes of said first signal and said second signal prior to combining said first signal with said second signal.

9. The portable audio apparatus of claim 4, wherein said adjusting means includes attenuating means for changing the magnitudes of said first signal and said second signal prior to combining said first signal with said second signal.

10. The portable audio apparatus of claim 8, wherein a variable resistor serves as said attenuating means.

11. The portable audio apparatus of claim 9, wherein a variable resistor serves as said attenuating means.

12. The portable audio apparatus of claim 8, wherein said control means includes switching means for providing an electrical path to a reference voltage level for said first signal and said second signal.

13. The portable audio apparatus of claim 9, wherein said control means includes switching means for providing an electrical path to a reference voltage level for said first signal and said second signal.

14. The portable audio apparatus of claim 10, wherein said variable resistor includes at least a first terminal, a second terminal and a third terminal, the resistance between said first terminal and second terminal being fixed, the resistance between said third terminal and said first terminal and between said third terminal and said second terminal varying based on said control means.

15. The portable audio apparatus of claim 11, wherein said variable resistor includes at least a first terminal, a second terminal and a third terminal, the resistance between said first terminal and said second terminal being fixed, the resistance between said third terminal and said first terminal and between said third terminal and said second terminal varying based on said control means.

16. The portable audio apparatus of claim 14, wherein said control means is coupled to said third terminal.

17. The portable audio apparatus of claim 15, wherein said control means is coupled to said third terminal.

18. The portable audio apparatus of claim 1, wherein said sound reproducing means includes a sound multiplex reproducing device having a vocal sound reproducing circuit and a musical tune reproducing circuit.

19. The portable audio apparatus of claim 1, wherein said first signal and second signal represent the lyrics and musical tune of a song, respectively.

20. The portable audio apparatus of claim 5, wherein said first signal and said second signal represent the lyrics and musical tune of a song, respectively.

21. The portable audio apparatus of claim 12, wherein said switching means is a push button switch disposed on said gripping means for manipulation by the thumb of a user.

22. The portable audio apparatus of claim 13, wherein said switching means is a push button switch disposed on said gripping means for manipulation by the thumb of a user.

23. The portable audio apparatus of claim 2, wherein said sound input means is a microphone.

24. The portable audio apparatus of claim 1, wherein said synthesizing means includes amplifying means for producing said output signal.

25. The portable audio apparatus of claim 5, wherein said synthesizing means includes amplifying means for producing said output signal.

26. The portable audio apparatus of claim 20, wherein said synthesizing means includes amplifying means for producing said output signal.

27. The portable audio apparatus of claim 5, wherein said sound reproducing means includes a sound multiplex reproducing device having a vocal sound reproducing circuit and a musical tune reproducing circuit.

28. The portable audio apparatus of claim 20, wherein said sound reproducing means includes a sound multiplex reproducing device having a vocal sound reproducing circuit and a musical tune reproducing circuit.

29. The portable audio apparatus of claim 2, wherein said gripping means is, disposed between said speaker means and said sound input means.

30. A portable audio and voice amplifying apparatus for outputting the lyric signal and musical signal of a song from a recording medium and an external voice sound, comprising:

a housing having a first side, a second side, a first end between said first and second sides and a second end opposed said first end;

a microphone for detecting the external voice sound;

means coupling said microphone to said housing in the region of said first end so that the microphone is joined to the housing as a unit and faces essentially in the direction faced by said first end;

recording medium receiving means positioned on the housing for receiving the recording medium;

a handle essentially mounted on the second side of the housing so that a space is formed between the housing and the handle, said handle being adapted so that when gripped by one hand of the user the entire apparatus is supported by the handle and the microphone can face essentially upwardly;

sound reproducing means for producing the lyrics signal and the musical signal from the recording medium;

synthesizing means for combining said lyrics signal with said musical signal, said synthesizing means producing an output signal representing the combination of said lyric signal with said musical signal;

adjusting means for varying the combination of said lyric signal with said musical signal represented by said output signal;

control means having a first position to permit said adjusting means to vary the relative strength of the combination of the first signal to said second signal and a second position for setting said adjusting means to a predetermined combination of said lyric signal with said musical signal; and speaker means for outputting the lyric signal and musical signal of the recording medium from the sound reproducing means and the external voice sound received by the microphone, said speaker means essentially positioned on the first side of the housing so as to be spaced from the microphone so that no feedback occurs.

31. The portable audio and voice amplifying apparatus of claim 30, further including switching means for controlling the sound reproducing means, said switching means being essentially mounted on said handle so that when gripped one handedly, the switching mean can be manipulated by the thumb of the user.

32. The portable audio apparatus of claim 31, wherein said control means is a push button switch disposed essentially in said switching means for manipulation by the thumb of the user.

33. The portable audio apparatus of claim 32, wherein said adjusting means varies the relative strength of the combination of said first signal to said second signal represented by said output signal by a single manual manipulation of said adjusting means.

34. The portable audio apparatus of claim 33, wherein said adjusting means is a dial.

35. The portable audio apparatus of claim 33, wherein said control means and said adjusting means are positioned adjacent to one another in said switching means.

36. A portable audio and voice amplifying apparatus for outputting signals from a recording medium and an external voice sound, comprising:

a housing;

sound input means attached to the housing for receiving the external voice sound;

sound reproducing means for producing a first signal and a second signal from the recording medium and positioned within said housing;

gripping means attached to said housing for permitting the holding of the apparatus by one hand of a user during use;

synthesizing means for combining the first signal and the second signal, said synthesizing means producing an output signal representing the combination of the first signal with the second signal;

adjusting means for varying the combination of said first signal with said second signal represented by said output signal;

control means having a first position to permit said adjusting means to vary the relative strength of the combination of the first signal to said second signal and a second position for setting said adjusting means to a predetermined combination of said first signal with said second signal; and speaker means for outputting said output signal and said external voice sound, said speaker means positioned in said housing and distanced from said sound input means to prevent feedback from the speaker means.

37. A portable audio and voice amplifying apparatus for outputting information from a recording medium and an external voice sound, comprising:

a housing having a first side, a second side, a first end between said first and second sides and a second end opposed said first end;

a microphone for detecting the external voice sound;

means coupling said microphone to said housing in the region of said first end so that the microphone is joined to the housing as a unit and faces essentially in the direction faced by said first end;

recording medium receiving means positioned on the housing for receiving the recording medium;

sound reproducing means for outputting the information on the recording medium represented by a first signal and a second signal and positioned in said housing;

speaker means for outputting the first signal and second signal of the recording medium from the sound reproducing means and the external voice sound received by the microphone, said speaker means essentially positioned on the first side of the housing so as to be spaced from the microphone so that no feedback occurs;

a handle essentially mounted on the second side of the housing so that a space is formed between the housing and the handle, said handle being adapted so that when gripped by one hand of the user the entire apparatus is supported by the handle and the microphone can face essentially upwardly; and switching means for controlling the sound reproducing means, said switching means being essentially mounted on said handle so that when gripped by one hand of the user the switching means can be manipulated by the thumb of the user.

38. The portable audio apparatus of claim 37, further including:

synthesizing means for combining said first signal with said second signal, said synthesizing means producing an output signal representing the combination of said first signal with said second signal;

adjusting means for varying the combination of said first signal with said second signal represented by said output signal; and control means for setting said adjusting means to a predetermined combination of said first signal with said second signal.

39. The portable audio apparatus of claim 38, wherein said control means is a push button switch disposed essentially in said switching means for manipulation by the thumb of the user.

40. The portable audio apparatus of claim 39, wherein said adjusting means varies the relative strength of the combination of said first signal to said second signal represented by said output signal by a single manual manipulation of said adjusting means.

41. The portable audio apparatus of claim 40, wherein said adjusting means is a dial.

42. The portable audio apparatus of claim 40, wherein said control means and said adjusting means are positioned adjacent to one another in said switching means.

* * * * *